(12) United States Patent
Fujita et al.

(10) Patent No.: US 8,706,930 B2
(45) Date of Patent: Apr. 22, 2014

(54) KVM SWITCH, METHOD FOR CONTROLLING THE SAME, SWITCHING SYSTEM FOR MULTI-MONITOR, AND SWITCHING METHOD FOR MULTI-MONITOR

(75) Inventors: Kenichi Fujita, Shinagawa (JP); Yu Sato, Shinagawa (JP); Naoyuki Nagao, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1066 days.

(21) Appl. No.: 12/285,784

(22) Filed: Oct. 14, 2008

(65) Prior Publication Data
US 2009/0102798 A1 Apr. 23, 2009

(30) Foreign Application Priority Data

Oct. 18, 2007 (JP) ................. 2007-271794

(51) Int. Cl.
*G06F 13/12* (2006.01)
(52) U.S. Cl.
USPC ............ 710/62; 710/63; 710/64; 710/65; 710/66; 710/67; 710/68; 710/69; 710/70; 710/71; 710/72; 710/73; 710/74
(58) Field of Classification Search
None
See application file for complete search history.

(56) References Cited

U.S. PATENT DOCUMENTS

| | | | |
|---|---|---|---|
| 5,761,200 A * | 6/1998 | Hsieh ........................... | 370/364 |
| 6,567,869 B2 * | 5/2003 | Shirley ........................... | 710/62 |
| 6,701,380 B2 * | 3/2004 | Schneider et al. ............. | 709/250 |
| 7,240,111 B2 * | 7/2007 | VanHarlingen et al. ....... | 709/224 |
| 7,246,183 B2 * | 7/2007 | Covington et al. ............. | 710/62 |
| 7,441,063 B2 * | 10/2008 | Tseng et al. ................... | 710/305 |
| 7,519,749 B1 * | 4/2009 | Sivertsen ........................ | 710/73 |
| 7,587,534 B2 * | 9/2009 | Liu et al. ........................ | 710/62 |
| 7,685,336 B2 * | 3/2010 | Chiang .......................... | 710/62 |
| 7,737,964 B2 * | 6/2010 | Liu ................................ | 345/213 |

(Continued)

FOREIGN PATENT DOCUMENTS

| | | |
|---|---|---|
| JP | 2000-201323 | 7/2000 |
| JP | 2000-330502 | 11/2000 |

(Continued)

OTHER PUBLICATIONS

HP Remote Graphics Software User Guide 5.4.5.*

(Continued)

*Primary Examiner* — Henry Tsai
*Assistant Examiner* — Jing-Yih Shyu
(74) *Attorney, Agent, or Firm* — Staas & Halsey LLP

(57) ABSTRACT

A KVM switch includes: a first input portion and a second input portion that inputs a plurality of video signals from the first and the second information processing apparatus, respectively; a converting portion that converts the video signals input from the first or second input portion into a plurality of pieces of image data which are capable of being displayed on a remote terminal; a transmitting and receiving portion that transmits the pieces of converted image data to the remote terminal, and receives various requests from the remote terminal; and a switching portion that switches the video signals input from the first input portion to the video signals input from the second input portion when the transmitting and receiving portion receives a switching request for switching from a first information processing apparatus to a second information processing apparatus from the remote terminal.

21 Claims, 41 Drawing Sheets

(56) References Cited

U.S. PATENT DOCUMENTS

| | | | |
|---|---|---|---|
| 7,853,740 B2* | 12/2010 | Liaw et al. | 710/62 |
| 7,886,091 B2* | 2/2011 | de Kerf | 710/62 |
| 8,015,332 B2* | 9/2011 | Kobayashi | 710/62 |
| 8,031,960 B2* | 10/2011 | Fukuhara et al. | 382/248 |
| 2003/0035049 A1* | 2/2003 | Dickens et al. | 348/100 |
| 2003/0084133 A1* | 5/2003 | Chan et al. | 709/222 |
| 2003/0160795 A1 | 8/2003 | Alcorn et al. | |
| 2004/0160967 A1 | 8/2004 | Fujita et al. | |
| 2005/0132403 A1* | 6/2005 | Lee et al. | 725/38 |
| 2005/0243098 A1* | 11/2005 | Gohara et al. | 345/581 |
| 2005/0246433 A1* | 11/2005 | Carrigan et al. | 709/223 |
| 2006/0017853 A1* | 1/2006 | Chang et al. | 348/584 |
| 2006/0020597 A1* | 1/2006 | Keating et al. | 707/6 |
| 2006/0236347 A1* | 10/2006 | Holovacs | 725/80 |
| 2006/0248100 A1* | 11/2006 | Dickens et al. | 707/100 |
| 2007/0022176 A1* | 1/2007 | Kobayashi | 709/217 |
| 2007/0022234 A1* | 1/2007 | Yang | 710/62 |
| 2007/0206122 A1* | 9/2007 | Dickens et al. | 348/705 |
| 2008/0155124 A1* | 6/2008 | Compton et al. | 709/250 |
| 2008/0177994 A1* | 7/2008 | Mayer | 713/2 |
| 2008/0222326 A1* | 9/2008 | Liu et al. | 710/62 |
| 2008/0307349 A1* | 12/2008 | Wang et al. | 715/778 |
| 2010/0245632 A1* | 9/2010 | Suzuki | 348/241 |

FOREIGN PATENT DOCUMENTS

| | | |
|---|---|---|
| JP | 2002-32068 | 1/2002 |
| JP | 2004-5449 | 1/2004 |
| JP | 2004-120441 | 4/2004 |
| JP | 2007-147928 | 6/2007 |

OTHER PUBLICATIONS

"UltraMatrix Remote", Rose Electronics Ltd. Web URL: <http://www.rose.com/htm/ultramatrixremote.htm>.

"HP Blade Workstation solution, Composition/operation image", Hewlett-Packard Ltd. Web URL:<http://h50146.www5.hp.com/products/workstations/blade_ws>.

Office Action issued by the Japanese Patent Office on Oct. 30, 2012 in the corresponding Japanese patent application No. 2007-271794.

Office Action issued by the Japanese Patent Office on Apr. 16, 2013 in the corresponding Japanese patent application No. 2007-271794.

* cited by examiner

FIG. 8

| WIDTH OF FRAME | HEIGHT OF FRAME | NUMBER OF BITS FOR EACH PIXEL | LUMI-NANCE | MAXIMUM LUMI-NANCE OF RED SIGNAL | MAXIMUM LUMI-NANCE OF GREEN SIGNAL | MAXIMUM LUMI-NANCE OF BLUE SIGNAL | SHIFT VALUE OF RED SIGNAL | SHIFT VALUE OF GREEN SIGNAL | SHIFT VALUE OF BLUE SIGNAL | LENGTH OF NAME | NAME |
|---|---|---|---|---|---|---|---|---|---|---|---|

FIG. 15

| BUTTON MASK | X-COORD-INATES | Y-COORD-INATES | SCREEN NO. |
|---|---|---|---|

FIG. 17

| BUTTON MASK | INCREMENT OF X-COORDINATES ($\Delta X$) | INCREMENT OF Y-COORDINATES ($\Delta Y$) |

FIG. 23

| REPLACEMENT REQUEST FLAG FOR SCREEN POSITIONS | SCREEN NO. 2 → SCREEN NO. 3 | SCREEN NO. 3 → SCREEN NO. 2 |

FIG. 30

| CHANGING REQUEST FLAG FOR SCREEN UPDATE MODE | MIRROR DISPLAY UPDATE MODE | SCREEN NO. 1 |

FIG. 33

| WIDTH OF FRAME | HEIGHT OF FRAME | NUMBER OF BITS FOR EACH PIXEL | LUMI-NANCE | MAXIMUM LUMI-NANCE OF RED SIGNAL | MAXIMUM LUMIN-ANCE OF GREEN SIGNAL | MAXIMUM LUMI-NANCE OF BLUE SIGNAL | SHIFT VALUE OF RED SIGNAL | SHIFT VALUE OF GREEN SIGNAL | SHIFT VALUE OF BLUE SIGNAL | LENGTH OF NAME | NAME | RE-DUCED SIZE |

FIG. 38

| CHANGING REQUEST FLAG FOR SCREEN UPDATE MODE | ENLARGEMENT/ REDUCTION DISPLAYING UPDATE MODE | ENLARGEMENT/ REDUCTION RATIO |
|---|---|---|

KVM SWITCH, METHOD FOR CONTROLLING THE SAME, SWITCHING SYSTEM FOR MULTI-MONITOR, AND SWITCHING METHOD FOR MULTI-MONITOR

The present application is based on and claims priority to Japanese Patent Application No. 2007-271794 filed Oct. 18, 2007, the entire disclosure of which is hereby incorporated by reference.

BACKGROUND OF THE INVENTION

1. Field of the Invention

The present invention relates to a KVM switch which is connected between a computer and peripheral devices such as a mouse, a keyboard, and a monitor, as well as a method for controlling the same, a switching system for multi-monitor, and a switching method for multi-monitor.

2. Description of the Related Art

Conventionally, there has been known a KVM (K:keyboard, V:video, M:mouse) switch including a terminal emulator which is connected between a plurality of servers and peripheral devices such as a mouse, a keyboard, and a monitor (see U.S. Pat. No. 6,567,869).

The KVM switch converts communication data output from a communication port (e.g. a serial port, a USB (Universal Serial Bus) port, or the like) of selected server into analog video data, and outputs the analog video data to the monitor. That is, the KVM switch can switch the communication data output from one of the plurality of servers to communication data output from another server, and display the switched communication data as an analog image on the monitor.

When the KVM switch is used, video outputs from the plurality of servers are switched, and hence a user cannot watch the pieces of video data together.

Conventionally, there has been known a KVM switch which is connected to a plurality of servers and peripheral devices such as the mouse, the keyboard, and the monitor, and is connected to a client which is a remote terminal via a network (See e.g. Rose. Electronics Ltd., product name "UltraMatrix Remote" http://www.rose.com/htm/ultramatrixremote.htm))

Further, conventionally, there has been known a system including a switching mechanism 34 which is provided between a plurality of compute resource units 14 and a plurality of visualization resource units 16, and interconnects between them (see Japanese Laid-Open Patent Publication No. 2004-5449).

Conventionally, there has been known a system including a server, a client, and a KVM switch connecting the server and the client to each other via a network (See e.g. Hewlett-Packard Ltd., HP Blade Workstation solution, Composition/operation image (http://h50146.www5.hp.com/products/workstations/blade_ws)).

However, the KVM switches in U.S. Pat. No. 6,567,869, and Rose Electronics Ltd. do not adapt to a multi-monitor function. That is, there is no KVM switch which can smoothly switch a plurality of video outputs output from each server, and outputs the plurality of video outputs to the remote terminal. In each of the compute resource units 14 in Japanese Laid-Open Patent Publication No. 2004-5449, and the server in Hewlett-Packard Ltd., the output of the video signal is only one, and hence they do not adapt to the plurality of video outputs.

Also, in the system of Rose Electronics Ltd., the signals of the keyboard, the mouse, and the video are brought together in the server, and compression processing is done to the signals. Therefore, a load is applied to the server.

SUMMARY OF THE INVENTION

It is an object of the present invention to provide a KVM switch, a method for controlling the same, a switching system for multi-monitor, and a switching method for multi-monitor which can smoothly switch a plurality of video signals that are output from each information processing apparatus, and correspond to a plurality of pieces of image data displayed on a remote terminal.

According to a first aspect of the present invention, there is provided a KVM switch connected between a first information processing apparatus and a second information processing apparatus, and a remote terminal, comprising: a first input portion that is capable of inputting a plurality of video signals output from the first information processing apparatus; a second input portion that is capable of inputting a plurality of video signals output from the second information processing apparatus; a converting portion that converts the plurality of video signals input from the first input portion or the second input portion into a plurality of pieces of image data which are capable of being displayed on the remote terminal; a transmitting and receiving portion that transmits the plurality of pieces of converted image data to the remote terminal, and receives various requests from the remote terminal; and a switching portion that switches the plurality of video signals input from the first input portion to the plurality of video signals input from the second input portion when the transmitting and receiving portion receives a switching request for switching from the first information processing apparatus to the second information processing apparatus from the remote terminal.

With the above arrangement, it is possible to smoothly switch the plurality of video signals that are output from each information processing apparatus, and correspond to the plurality of pieces of image data displayed on the remote terminal. The plurality of video signals that are output from each information processing apparatus can be collectively treated, so that the multi-monitor environment can be remote-operated with a high operability.

Since the KVM switch connected to the first information processing apparatus and the second information processing apparatus provides the switching and the remote operation of the video signals, the resources of the first information processing apparatus and the second information processing apparatus are not consumed, so that the processing performance of the first information processing apparatus and the second information processing apparatus is not influenced. Further, since the remote terminal is not directly connected to the first information processing apparatus and the second information processing apparatus, the remote terminal does not influence the security of the first information processing apparatus and the second information processing apparatus. Moreover, since the KVM switch converts the plurality of video signals input from the first information processing apparatus or the second information processing apparatus into the plurality of pieces of image data which are capable of being displayed on the remote terminal, and transmits the pieces of converted image data to the remote terminal, the pieces of image data can be transmitted to the remote terminal without imparting the load of a conversion process to the first information processing apparatus or the second information processing apparatus.

Preferably, the remote terminal is connected to the KVM switch via a network.

With the above arrangement, it is possible to smoothly switch the plurality of video signals that are output from each information processing apparatus, and correspond to the plurality of pieces of image data displayed on the remote terminal, via the network.

Preferably, the KVM switch further comprises a first output portion that outputs data which the transmitting and receiving portion receives from the remote terminal, to the first information processing apparatus, and a second output portion that outputs data which the transmitting and receiving portion receives from the remote terminal, to the second information processing apparatus, wherein when the transmitting and receiving portion receives the switching request for switching from the first information processing apparatus to the second information processing apparatus from the remote terminal, the switching portion switches an output source of the data received from the remote terminal from the first output portion to the second output portion.

With the above arrangement, it is possible to switch the output resource of the data received from the remote terminal at the same time as switching the plurality of video signals output from the first information processing apparatus.

Preferably, the converting portion divides each of the plurality of video signals input from the first input portion or the second input portion into pieces of data of any size, adds information that decides a display position and a display size on the screen of the remote terminal and type information of the corresponding video signal to the pieces of data, and generates the image data corresponding to the video signal.

With the above arrangement, it is possible to decide the display position and the display size of image data, on the screen of the remote terminal, corresponding to each of the plurality of video signals input from the first input portion or the second input portion.

Preferably, the transmitting and receiving portion receives a request for replacing the positions of the plurality of pieces of image data displayed on the remote terminal with each other from the remote terminal, the converting portion replaces the positions of the plurality of pieces of image data displayed on the remote terminal with each other based on the request, and the transmitting and receiving portion transmits the plurality of pieces of image data with which the positions have been replaced, to the remote terminal.

With the above arrangement, the remote terminal can provide the display matched to multi-monitor output of the first information processing apparatus or the second information processing apparatus without changing connection positions of cables outputting the video signals, to the KVM switch.

Preferably, the transmitting and receiving portion receives a request for receiving differences between the pieces of present image data and the pieces of immediately preceding image data displayed on the remote terminal, the converting portion detects, with respect to each of the plurality of video signals input from the first input portion or the second input portion, differences between present video signal and immediately preceding video signal, and converts a video signal corresponding to the differences into the image data which is capable of being displayed on the remote terminal, and the transmitting and receiving portion transmits the converted image data to the remote terminal.

With the above arrangement, it is possible to reduce an amount of transmission of the pieces of the image data transmitted to the remote terminal, and hence the display of the pieces of the image data in the remote terminal is smoothly updated. Further, the load to the network can be reduced.

Preferably, the transmitting and receiving portion receives a mirror display request for displaying one image data on a plurality of screens in the remote terminal, from the remote terminal, the converting portion converts one video signal selected by the mirror display request among the plurality of video signals input from the first input portion or the second input portion into the image data which is capable of being displayed on the remote terminal, and the transmitting and receiving portion transmits the converted image data to the remote terminal.

With the above arrangement, the remote terminal can execute the mirror display displaying one image data on the plurality of screens.

Preferably, the transmitting and receiving portion receives from the remote terminal a request for displaying the image data selected by a user in a normal size and the image data unselected by the user in a reduced size, among the plurality of image data displayed on the remote terminal, the converting portion converts the video signal corresponding to the selected image data into the image data of the normal size, and the video signal corresponding to the unselected image data into the image data of the reduced size, among the video signals input from the first input portion or the second input portion, and the transmitting and receiving portion transmits the pieces of converted image data to the remote terminal.

With the above arrangement, it is possible to reduce an amount of transmission of the pieces of the image data transmitted to the remote terminal, and hence the display of the pieces of the image data in the remote terminal is smoothly updated. Further, the load to the network can be reduced.

Preferably, the transmitting and receiving portion receives a request for enlargement/reduction of a plurality of screens corresponding to the plurality of pieces of image data displayed on the remote terminal from the remote terminal, the converting portion enlarges or reduces the plurality of screens displaying the plurality of pieces of image data corresponding to the plurality of video signals input from the first input portion or the second input portion based on an enlargement/reduction ratio of the plurality of screens included in the request, and the transmitting and receiving portion transmits data of the plurality of enlarged or reduced screens to the remote terminal.

With the above arrangement, the remote terminal can display the plurality of screens in an enlarged/reduced size. When the plurality of screens are included in a single window, the plurality of screens are collectively displayed in the enlarged/reduced size.

According to a second aspect of the present invention, there is provided a switching system for multi-monitor comprising: a first information processing apparatus and a second information processing apparatus that output a plurality of video signals; a KVM switch including: a first input portion that is capable of inputting the plurality of video signals output from the first information processing apparatus; a second input portion that is capable of inputting the plurality of video signals output from the second information processing apparatus; a converting portion that converts the plurality of video signals input from the first input portion or the second input portion into a plurality of pieces of image data which are capable of being displayed on a remote terminal; a transmitting and receiving portion that transmits the plurality of pieces of converted image data to the remote terminal, and receives various requests from the remote terminal; and a switching portion that switches the plurality of video signals input from the first input portion to the plurality of video signals input from the second input portion when the transmitting and receiving portion receives a switching request for switching from the first information processing apparatus to the second information processing apparatus from the remote terminal; and the remote terminal that is connected to the KVM switch via a network, and displays the plurality of pieces of converted image data on a single application.

With the above arrangement, it is possible to smoothly switch the plurality of video signals that are output from each information processing apparatus, and correspond to the plurality of pieces of image data displayed on the remote terminal. The plurality of video signals that are output from each information processing apparatus can be collectively treated, so that the multi-monitor environment can be remote-operated with a high operability.

Since the KVM switch connected to the first information processing apparatus and the second information processing apparatus provides the switching and the remote operation of the video signals, the resources of the first information processing apparatus and the second information processing apparatus are not consumed, so that the processing performance of the first information processing apparatus and the second information processing apparatus is not influenced. Further, since the remote terminal is not directly connected to the first information processing apparatus and the second information processing apparatus, the remote terminal does not influence the security of the first information processing apparatus and the second information processing apparatus. Moreover, since the KVM switch converts the plurality of video signals input from the first information processing apparatus or the second information processing apparatus into the plurality of pieces of image data which are capable of being displayed on the remote terminal, and transmits the pieces of converted image data to the remote terminal, the pieces of image data can be transmitted to the remote terminal without imparting the load of a conversion process to the first information processing apparatus or the second information processing apparatus.

Preferably, the first information processing apparatus includes a plurality of output terminals corresponding to the plurality of video signals, the plurality of output terminals being connected to the first input portion with a single cable, and the second information processing apparatus includes a plurality of output terminals corresponding to the plurality of video signals, the plurality of output terminals being connected to the second input portion with a single cable.

With the above arrangement, it is possible to reduce the number of cables, and a user can easily confirm the connection between the KVM switch, and the first information processing apparatus and the second information processing apparatus.

Preferably, the first information processing apparatus includes a plurality of output terminals corresponding to the plurality of video signals, the plurality of output terminals being connected to the first input portion with a single cable including a circuit which converts the plurality of video signals into a single digital signal, and the second information processing apparatus includes a plurality of output terminals corresponding to the plurality of video signals, the plurality of output terminals being connected to the second input portion with a single cable including a circuit which converts the plurality of video signals into a single digital signal.

With the above arrangement, it is possible to reduce the number of cables, and the user can easily confirm the connection between the KVM switch, and the first information processing apparatus and the second information processing apparatus.

Preferably, the KVM switch further includes a first output portion that outputs data which the transmitting and receiving portion receives from the remote terminal, to the first information processing apparatus, and a second output portion that outputs data which the transmitting and receiving portion receives from the remote terminal, to the second information processing apparatus, wherein when the transmitting and receiving portion receives the switching request for switching from the first information processing apparatus to the second information processing apparatus from the remote terminal, the switching portion switches an output source of the data received from the remote terminal from the first output portion to the second output portion.

With the above arrangement, it is possible to switch the output resource of the data received from the remote terminal at the same time as switching the plurality of video signals output from the first information processing apparatus.

More preferably, a keyboard, a mouse or a touch panel is connectable to the remote terminal, and the data received from the remote terminal is output according to the operation of the keyboard, the mouse or the touch panel.

With the above arrangement, the first information processing apparatus and the second information processing apparatus can input the data output from the keyboard, the mouse or the touch panel according to the operation of the keyboard, the mouse or the touch panel.

Preferably, the converting portion that divides each of the plurality of video signals input from the first input portion or the second input portion into pieces of data of any size, adds information that decides a display position and a display size on the screen of the remote terminal and type information of the corresponding video signal to the pieces of data, and generates the image data corresponding to the video signal.

With the above arrangement, it is possible to decide the display position and the display size of image data, on the screen of the remote terminal, corresponding to each of the plurality of video signals input from the first input portion or the second input portion.

Preferably, the remote terminal transmits a request for replacing the positions of the plurality of pieces of image data displayed on the application with each other to the KVM switch, the transmitting and receiving portion receives the request for replacing the positions of the plurality of pieces of image data with each other, the converting portion replaces the positions of the plurality of pieces of image data with each other based on the request, and the transmitting and receiving portion transmits the plurality of pieces of image data with which the positions have been replaced, to the remote terminal.

With the above arrangement, the remote terminal can provide the display matched to the output of the plurality of video signals (i.e., multi-monitor output) of the first information processing apparatus or the second information processing apparatus without changing connection positions of cables connected between the first information processing apparatus or the second information processing apparatus and the KVM switch.

Preferably, the remote terminal transmits a request for changing the number of pieces of image data displayed on the application to the first information processing apparatus or the second information processing apparatus via the KVM switch, the first information processing apparatus or the second information processing apparatus outputs the video signal(s) of the number corresponding to the request to the KVM switch, the converting portion converts the video signal(s) of the number corresponding to the request into piece(s) of image data which is/are capable of being displayed on the application, and changes the display position(s) of the piece(s) of the converted image data on the application, and the transmitting and receiving portion transmits the piece(s) of the image data in which the display position(s) has/have been changed, to the remote terminal.

With the above arrangement, the remote terminal can change the number of pieces of image data displayed on the application.

Preferably, the remote terminal transmits a request for receiving differences between the pieces of present image data and the pieces of immediately preceding image data displayed on the application, the transmitting and receiving portion receives the request, the converting portion detects, with respect to each of the plurality of video signals input from the first input portion or the second input portion, differences between present video signal and immediately preceding video signal, and converts a video signal corresponding to the differences into the image data which is capable of being displayed on the remote terminal, and the transmitting and receiving portion transmits the converted image data to the remote terminal.

With the above arrangement, it is possible to reduce an amount of transmission of the pieces of the image data transmitted to the remote terminal, and hence the display of the pieces of the image data in the remote terminal is smoothly updated. Further, the load to the network can be reduced.

Preferably, the remote terminal transmits a mirror display request for displaying one image data on a plurality of screens in the remote terminal, to the KVM switch, the transmitting and receiving portion receives the mirror display request from the remote terminal, the converting portion converts one video signal selected by the mirror display request among the plurality of video signals input from the first input portion or the second input portion into the image data which is capable of being displayed on the remote terminal, and the transmitting and receiving portion transmits the converted image data to the remote terminal.

With the above arrangement, the remote terminal can execute the mirror display displaying one image data on the plurality of screens.

Preferably, the remote terminal transmits to the KVM switch a request for displaying the image data selected by a user in a normal size and the image data unselected by the user in a reduced size, among the plurality of image data displayed on the application, the transmitting and receiving portion receives the request from the remote terminal, the converting portion converts the video signal corresponding to the selected image data into the image data of the normal size, and the video signal corresponding to the unselected image data into the image data of the reduced size, among the video signals input from the first input portion or the second input portion, and the transmitting and receiving portion transmits the pieces of converted image data to the remote terminal.

With the above arrangement, it is possible to reduce an amount of transmission of the pieces of the image data transmitted to the remote terminal, and hence the display of the pieces of the image data in the remote terminal is smoothly updated. Further, the load to the network can be reduced.

Preferably, the remote terminal transmits a request for enlargement/reduction of a plurality of screens corresponding to the plurality of pieces of image data displayed on the application to the KVM switch, the transmitting and receiving portion receives the request from the remote terminal, the converting portion enlarges or reduces the plurality of screens displaying the plurality of pieces of image data corresponding to the plurality of video signals input from the first input portion or the second input portion based on an enlargement/reduction ratio of the plurality of screens included in the request, and the transmitting and receiving portion transmits data of the plurality of enlarged or reduced screens to the remote terminal.

With the above arrangement, the remote terminal can display the plurality of screens displayed on the single application in an enlarged/reduced size.

Preferably, the remote terminal enlarges or reduces the plurality of screens corresponding to the plurality of pieces of image data displayed on the application.

With the above arrangement, the remote terminal can display the plurality of screens displayed on the single application in an enlarged/reduced size.

Preferably, the remote terminal includes the display devices of the same number as the plurality of video signals output from the first information processing apparatus or the second information processing apparatus, and the transmitting and receiving portion transmits the plurality of pieces of image data converted by the converting portion.

With the above arrangement, single image data can be displayed on each of the display devices.

More preferably, the display devices of the same number as the plurality of video signals output from the first information processing apparatus or the second information processing apparatus are connected to the KVM switch, and each of the display devices included in the remote terminal displays the same image data as the image data displayed on the display device of a corresponding position.

With the above arrangement, in the remote terminal, the user can obtain operational feelings similar to the case of operating the first information processing apparatus or the second information processing apparatus in a local.

Preferably, the remote terminal includes an input device that inputs data, a display device that displays the application, a device driver that controls the display of the display device, a first filter driver that transmits the image data received by the application to the device driver, and a second filter driver that transmits the data input by the input device to the device driver.

With the above arrangement, the first filter driver transmits the image data received by the application to the device driver, so that the screen without displaying a window frame, other menus and icons, and so on is directly displayed on the display device. Further, the second filter driver transmits the data input by the input device to the device driver, so that a state to operate the first information processing apparatus or the second information processing apparatus on the spot (where the first information processing apparatus or the second information processing apparatus is placed) can be achieved at a remote place, and operational feelings equivalent to conventional operational feelings can be provided for the user.

According to a third aspect of the present invention, there is provided a method for controlling a KVM switch connected between a first information processing apparatus and a second information processing apparatus, and a remote terminal, comprising: a first input step that is capable of inputting a plurality of video signals output from the first information processing apparatus; a second input step that is capable of inputting a plurality of video signals output from the second information processing apparatus; a converting portion that converts the plurality of video signals input in the first input step or the second input step into a plurality of pieces of image data which are capable of being displayed on the remote terminal; a transmitting and receiving step that transmits the plurality of pieces of converted image data to the remote terminal, and receives various requests from the remote terminal; and a switching step that switches the plurality of video signals input in the first input step to the plurality of video signals input in the second input step when the transmitting and receiving portion receives a switching request for switching from the first information processing apparatus to the second information processing apparatus from the remote terminal.

With the above arrangement, it is possible to smoothly switch the plurality of video signals that are output from each information processing apparatus, and correspond to the plurality of pieces of image data displayed on the remote terminal. The plurality of video signals that are output from each information processing apparatus can be collectively treated, so that the multi-monitor environment can be remote-operated with a high operability.

Since the KVM switch connected to the first information processing apparatus and the second information processing apparatus provides the switching and the remote operation of the video signals, the resources of the first information processing apparatus and the second information processing apparatus are not consumed, so that the processing performance of the first information processing apparatus and the second information processing apparatus is not influenced. Further, since the remote terminal is not directly connected to the first information processing apparatus and the second information processing apparatus, the remote terminal does not influence the security of the first information processing apparatus and the second information processing apparatus. Moreover, since the KVM switch converts the plurality of video signals input from the first information processing apparatus or the second information processing apparatus into the plurality of pieces of image data which are capable of being displayed on the remote terminal, and transmits the pieces of converted image data to the remote terminal, the pieces of image data can be transmitted to the remote terminal without imparting the load of a conversion process to the first information processing apparatus or the second information processing apparatus.

According to a fourth aspect of the present invention, there is provided a switching method for multi-monitor executed by a KVM switch which is connected to a first information processing apparatus and a second information processing apparatus outputting a plurality of video signals, comprising: a first input step that is capable of inputting the plurality of video signals output from the first information processing apparatus; a second input step that is capable of inputting the plurality of video signals output from the second information processing apparatus; a converting portion that converts the plurality of video signals input in the first input step or the second input step into a plurality of pieces of image data which are capable of being displayed on a remote terminal; a transmitting and receiving step that transmits the plurality of pieces of converted image data to the remote terminal, and receives various requests from the remote terminal; and a switching step that switches the plurality of video signals input in the first input step to the plurality of video signals input in the second input step when the transmitting and receiving step receives a switching request for switching from the first information processing apparatus to the second information processing apparatus from the remote terminal; and the remote terminal that is connected to the KVM switch via a network, and displays the plurality of pieces of converted image data on a single application.

With the above arrangement, it is possible to smoothly switch the plurality of video signals that are output from each information processing apparatus, and correspond to the plurality of pieces of image data displayed on the remote terminal. The plurality of video signals that are output from each information processing apparatus can be collectively treated, so that the multi-monitor environment can be remote-operated with a high operability.

Since the KVM switch connected to the first information processing apparatus and the second information processing apparatus provides the switching and the remote operation of the video signals, the resources of the first information processing apparatus and the second information processing apparatus are not consumed, so that the processing performance of the first information processing apparatus and the second information processing apparatus is not influenced. Further, since the remote terminal is not directly connected to the first information processing apparatus and the second information processing apparatus, the remote terminal does not influence the security of the first information processing apparatus and the second information processing apparatus. Moreover, since the KVM switch converts the plurality of video signals input from the first information processing apparatus or the second information processing apparatus into the plurality of pieces of image data which are capable of being displayed on the remote terminal, and transmits the pieces of converted image data to the remote terminal, the pieces of image data can be transmitted to the remote terminal without imparting the load of a conversion process to the first information processing apparatus or the second information processing apparatus.

Preferably, the KVM switch further executes a first output step that outputs data which the transmitting and receiving step receives from the remote terminal, to the first information processing apparatus, and a second output step that outputs data which the transmitting and receiving step receives from the remote terminal, to the second information processing apparatus, wherein when the transmitting and receiving step receives the switching request for switching from the first information processing apparatus to the second information processing apparatus from the remote terminal, the switching step switches an output source of the data received from the remote terminal from the first output step to the second output step.

With the above arrangement, it is possible to switch the output resource of the data received from the remote terminal at the same time as switching the plurality of video signals output from the first information processing apparatus.

More preferably, a keyboard, a mouse or a touch panel is connectable to the remote terminal, and the data received from the remote terminal is output according to the operation of the keyboard, the mouse or the touch panel.

With the above arrangement, the first information processing apparatus and the second information processing apparatus can input the data output from the keyboard, the mouse or the touch panel according to the operation of the keyboard, the mouse or the touch panel.

Preferably, the converting step that divides each of the plurality of video signals input in the first input step or the second input step into pieces of data of any size, adds information that decides a display position and a display size on the screen of the remote terminal and type information of the corresponding video signal to the pieces of data, and generates the image data corresponding to the video signal.

With the above arrangement, it is possible to decide the display position and the display size of image data, on the screen of the remote terminal, corresponding to each of the plurality of video signals input in the first input step or the second input step.

Preferably, the remote terminal transmits a request for replacing the positions of the plurality of pieces of image data displayed on the application with each other to the KVM switch, the transmitting and receiving step receives the request for replacing the positions of the plurality of pieces of image data with each other, the converting step replaces the positions of the plurality of pieces of image data with each other based on the request, and the transmitting and receiving step transmits the plurality of pieces of image data with which the positions have been replaced, to the remote terminal.

With the above arrangement, the remote terminal can provide the display matched to the output of the plurality of video signals (i.e., multi-monitor output) of the first information processing apparatus or the second information processing apparatus without changing connection positions of cables connected between the first information processing apparatus or the second information processing apparatus and the KVM switch.

Preferably, the remote terminal transmits a request for changing the number of pieces of image data displayed on the application to the first information processing apparatus or the second information processing apparatus via the KVM switch, the first information processing apparatus or the second information processing apparatus outputs the video signal(s) of the number corresponding to the request to the KVM switch, the converting step converts the video signal(s) of the number corresponding to the request into piece(s) of image data which is/are capable of being displayed on the application, and changes the display position(s) of the piece(s) of the converted image data on the application, and the transmitting and receiving step transmits the piece(s) of the image data in which the display position(s) has/have been changed, to the remote terminal.

With the above arrangement, the remote terminal can change the number of pieces of image data displayed on the application.

Preferably, the remote terminal transmits a request for receiving differences between the pieces of present image data and the pieces of immediately preceding image data displayed on the application, the transmitting and receiving step receives the request, the converting step detects, with respect to each of the plurality of video signals input in the first input step or the second input step, differences between present video signal and immediately preceding video signal, and converts a video signal corresponding to the differences into the image data which is capable of being displayed on the remote terminal, and the transmitting and receiving step transmits the converted image data to the remote terminal.

With the above arrangement, it is possible to reduce an amount of transmission of the pieces of the image data transmitted to the remote terminal, and hence the display of the pieces of the image data in the remote terminal is smoothly updated. Further, the load to the network can be reduced.

Preferably, the remote terminal transmits a mirror display request for displaying one image data on a plurality of screens in the remote terminal, to the KVM switch, the transmitting and receiving step receives the mirror display request from the remote terminal, the converting step converts one video signal selected by the mirror display request among the plurality of video signals input in the first input step or the second input step into the image data which is capable of being displayed on the remote terminal, and the transmitting and receiving step transmits the converted image data to the remote terminal.

With the above arrangement, the remote terminal can execute the mirror display displaying one image data on the plurality of screens.

Preferably, the remote terminal transmits to the KVM switch a request for displaying the image data selected by a user in a normal size and the image data unselected by the user in a reduced size, among the plurality of image data displayed on the application, the transmitting and receiving step receives the request from the remote terminal, the converting step converts the video signal corresponding to the selected image data into the image data of the normal size, and the video signal corresponding to the unselected image data into the image data of the reduced size, among the video signals input in the first input step or the second input step, and the transmitting and receiving step transmits the pieces of converted image data to the remote terminal.

With the above arrangement, it is possible to reduce an amount of transmission of the pieces of the image data transmitted to the remote terminal, and hence the display of the pieces of the image data in the remote terminal is smoothly updated. Further, the load to the network can be reduced.

Preferably, the remote terminal transmits a request for enlargement/reduction of a plurality of screens corresponding to the plurality of pieces of image data displayed on the application to the KVM switch, the transmitting and receiving step receives the request from the remote terminal, the converting step enlarges or reduces the plurality of screens displaying the plurality of pieces of image data corresponding to the plurality of video signals input in the first input step or the second input step based on an enlargement/reduction ratio of the plurality of screens included in the request, and the transmitting and receiving step transmits data of the plurality of enlarged or reduced screens to the remote terminal.

With the above arrangement, the remote terminal can display the plurality of screens displayed on the single application in an enlarged/reduced size.

Preferably, the remote terminal enlarges or reduces the plurality of screens corresponding to the plurality of pieces of image data displayed on the application.

With the above arrangement, the remote terminal can display the plurality of screens displayed on the single application in an enlarged/reduced size.

Preferably, the remote terminal includes the display devices of the same number as the plurality of video signals output from the first information processing apparatus or the second information processing apparatus, and the transmitting and receiving step transmits the plurality of pieces of image data converted in the converting step.

With the above arrangement, single image data can be displayed on each of the display devices.

More preferably, the display devices of the same number as the plurality of video signals output from the first information processing apparatus or the second information processing apparatus are connected to the KVM switch, and each of the display devices included in the remote terminal displays the same image data as the image data displayed on the display device of a corresponding position.

With the above arrangement, in the remote terminal, the user can obtain operational feelings similar to the case of operating the first information processing apparatus or the second information processing apparatus in a local.

Preferably, the remote terminal executes an input step that inputs data, a display step that displays the application on a display device, a display controlling step that controls the display of the display device, a first transmitting step that transmits the image data received by the application to the display controlling step, and a second transmitting step that transmits the data input in the input step to the display controlling step.

With the above arrangement, the first transmitting step transmits the image data received by the application to the display controlling step, so that the screen without displaying a window frame, other menus and icons, and so on is directly displayed on the display device. Further, the second transmitting step transmits the data input by the input step to the display controlling step, so that a state to operate the first information processing apparatus or the second information processing apparatus on the spot (where the first information processing apparatus or the second information processing apparatus is placed) can be achieved at a remote place, and operational feelings equivalent to conventional operational feelings can be provided for the user.

BRIEF DESCRIPTION OF THE DRAWINGS

Preferred embodiments of the present invention will be described in detail with reference to the following drawings, wherein:

FIG. 3 is a schematic diagram showing a connection state between the KVM switch 1 and a server 2a;

FIG. 4 is a schematic diagram showing a connection state between the KVM switch 1 and the server 2a;

FIG. 7 is a diagram showing the configuration of a screen of the server 2a;

FIG. 8 is a diagram showing an example of frame information;

FIG. 13 is a diagram showing an example of data generated by a controlling unit 151a;

FIG. 15 is a diagram showing an example of data generated by the controlling unit 151a;

FIG. 17 is a diagram showing an example of data generated by the controlling unit 151a;

FIG. 23 is a diagram showing an example of data of a changing request in a screen update mode;

FIG. 30 is a diagram showing an example of data of the changing request in the screen update mode;

FIG. 33 is a diagram showing an example of the frame information;

FIG. 38 is a diagram showing an example of data of the changing request in the screen update mode;

DESCRIPTION OF THE PREFERRED EMBODIMENTS

A description will now be given, with reference to the accompanying drawings, of an embodiment of the present invention.

Figure 1:
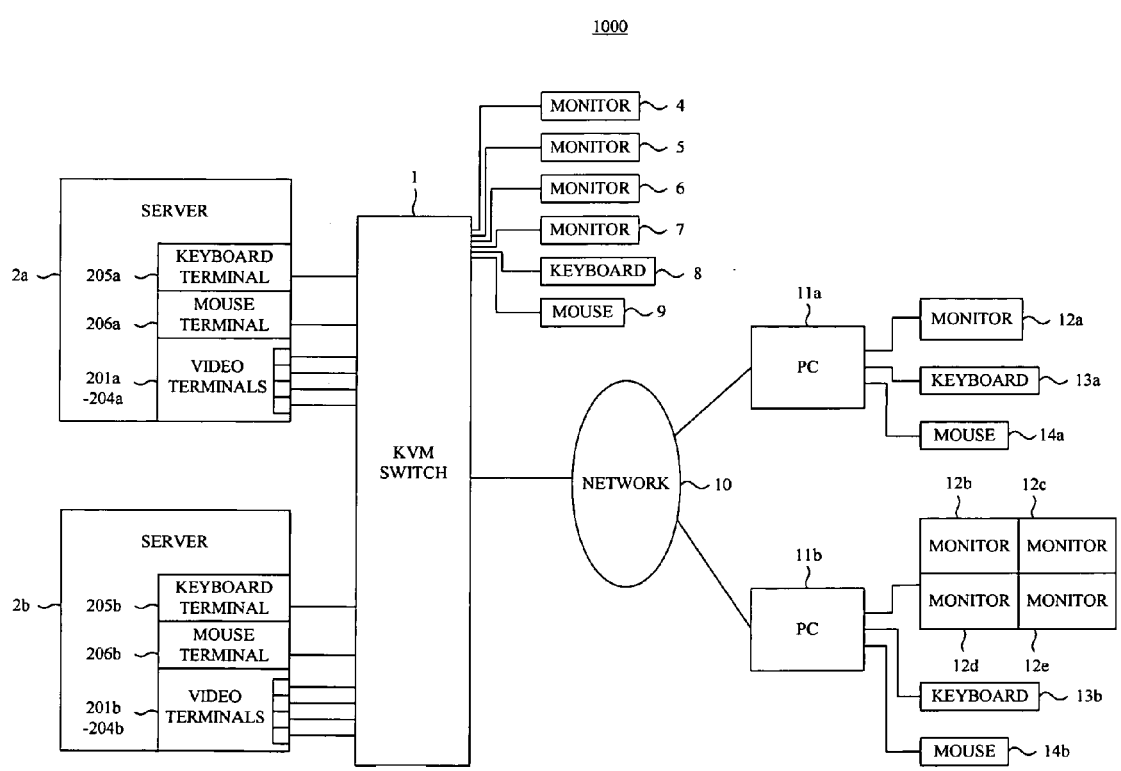
FIG. 1 is a diagram showing the overall configuration of a switching system for multi-monitor including a KVM switch 1.

FIG. 1 is a diagram showing the overall configuration of a switching system for multi-monitor including a KVM switch 1.

As shown in FIG. 1, a switching system 1000 for multi-monitor is provided with a KVM switch (K:keyboard, V:video, M:mouse) 1, servers 2a and 2b, monitors 4 to 7, a keyboard 8, and a mouse 9. The elements compose a local system.

Further, the switching system 1000 for multi-monitor is provided with a PC 11a to which a monitor 12a, a keyboard 13a, and a mouse 14a are connected, and a PC 11b to which monitors 12b to 12e, a keyboard 13b, and a mouse 14b are connected. The PCs 11a and 11b are remote terminals which are connected to the KVM switch 1 via a network 10.

The server 2a includes video terminals 201a to 204a outputting video signals, a keyboard terminal 205a for connecting a keyboard, and a mouse terminal 206a for connecting a mouse. Each of these terminals is connected to the KVM switch 1 via a cable.

The server 2b includes video terminals 201b to 204b outputting video signals, a keyboard terminal 205b for connecting a keyboard, and a mouse terminal 206b for connecting a mouse. Each of these terminals is connected to the KVM switch 1 via a cable.

The monitors 4 to 7, the keyboard 8, and the mouse 9 are connected to the KVM switch 1. The monitors 4 to 7 can display the video signals output from the video terminals 201a to 204a or the video terminals 201b to 204b. Key data from the keyboard 8 can be input to the keyboard terminal 205a or 205b via the KVM switch 1. Mouse data from the mouse 9 can be input to the mouse terminal 206a or 206b via the KVM switch 1.

The video signals output from the video terminals 201a to 204a or the video terminals 201b to 204b are transmitted to the PC 11a via the KVM switch 1 and the network 10, and are displayed on the monitor 12a in a state where the video signals are divided into four signals. Also, the video signals output from the video terminals 201a to 204a or the video terminals 201b to 204b are transmitted to the PC 11b via the KVM switch 1 and the network 10, and are displayed on the monitors 12b to 12e, respectively. Key data from the keyboard 13a can be input to the keyboard terminal 205a or 205b via the KVM switch 1 and the network 10. Mouse data from the mouse 14a can be input to the mouse terminal 206a or 206b via the KVM switch 1 and the network 10. Similarly, key data from the keyboard 13b and mouse data from the mouse 14b can be input to the keyboard terminal 205a and the mouse terminal 206a, or the keyboard terminal 205b and the mouse terminal 206b via the KVM switch 1 and the network 10.

That is, a user can operate the server 2a or 2b via the network 10 and the KVM switch 1 from the remote operating application run on the PC 11a or 11b.

The server or the PC connected to the KVM switch 1 may be more than two. The monitor connected to the KVM switch 1 may be one or more. Moreover, the number of video terminals included in each server may be one or more.

Figure 2:
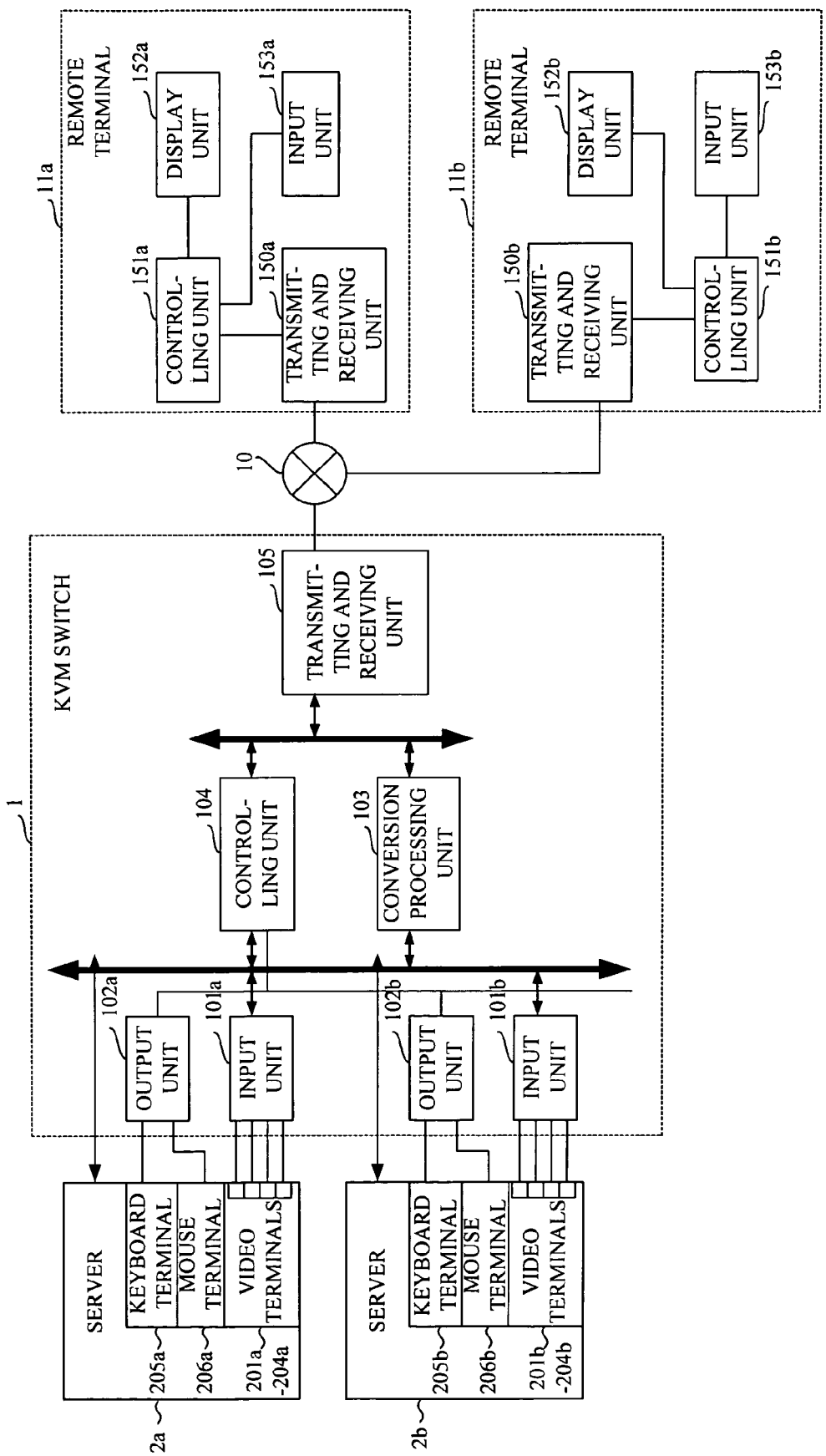
FIG. 2 is a block diagram showing the configuration of the KVM switch 1, a PC 11a, and a PC 11b.

FIG. 2 is a block diagram showing the configuration of the KVM switch 1, the PC 11a, and the PC 11b.

The KVM switch 1 includes: input units 101a and 101b (a first input portion, and a second input portion) that input the plurality of video signals output from the video terminals 201a to 204a and the video terminals 201b to 204b, respectively; an output unit 102a (a first output portion) that outputs the key data from the keyboard 13a or 13b to the keyboard terminal 205a, and outputs the mouse data from the mouse 14a or 14b to the mouse terminal 206a; and an output unit 102b (a second output portion) that outputs the key data from the keyboard 13a or 13b to the keyboard terminal 205b, and outputs the mouse data from the mouse 14a or 14b to the mouse terminal 206b.

Further, the KVM switch 1 includes: a conversion processing unit 103 (a conversion portion) that converts the input video signals into the pieces of video data displayed on the PC 11a or 11b; a controlling unit 104 (a switching portion) that switches an input source of the video signals and an output destination of the key data and the mouse data between the server 2a and 2b; a transmitting and receiving unit 105 (a transmitting and receiving portion) that transmits the pieces of the video data to the monitor 12a or the monitors 12b to 12e, and receives the key data and the mouse data from the PC 11a or 11b.

The input units 101a and 101b are composed of input terminals inputting the video terminals, and the output units 102a and 102b are composed of output terminals outputting the key data and the mouse data. The transmitting and receiving unit 105 is composed of a communication interface which is connectable to the network 10, and the conversion processing unit 103 and the controlling unit 104 are composed of a CPU which executes a control program stored into a RAM or a ROM. The output units 102a and 102b are connected to the controlling unit 104. The input units 101a and 101b, and the transmitting and receiving unit 105 are connected to the conversion processing unit 103 and the controlling unit 104.

The PC 11a includes: an input unit 153a that inputs the key data from the keyboard 13a and the mouse data from the mouse 14a; a transmitting and receiving unit 150a that transmits the key data from the keyboard 13a and the mouse data from the mouse 14a to the KVM switch 1, and receives the pieces of the video data from the KVM switch 1; a display unit 152a that displays the pieces of the received video data at given display positions of the remote operating application; a controlling unit 151a that controls the operation of the transmitting and receiving unit 150a, the display unit 152a, and the input unit 153a.

The controlling unit 151a is connected to the transmitting and receiving unit 150a, the display unit 152a, and the input unit 153a, and the transmitting and receiving unit 150a is connected to the transmitting and receiving unit 105 via the network 10. The controlling unit 151a has the remote operating application. When the remote operating application is started by the instruction of the input unit 153a, the remote operating application is displayed on the display unit 152a. The plurality of video signals output from the video terminals 201a to 204a or the video terminals 201b to 204b are converted with the KVM switch 1, and are displayed on the remote operating application.

Similarly to the PC 11a, the PC 11b includes a transmitting and receiving unit 150b, a controlling unit 151b, a display unit 152b, and an input unit 153b. The functions of the transmitting and receiving unit 150b, the controlling unit 151b, the display unit 152b, and the input unit 153b are the same as those of the transmitting and receiving unit 150a, the controlling unit 151a, the display unit 152a, and the input unit 153a.

Figure 3:
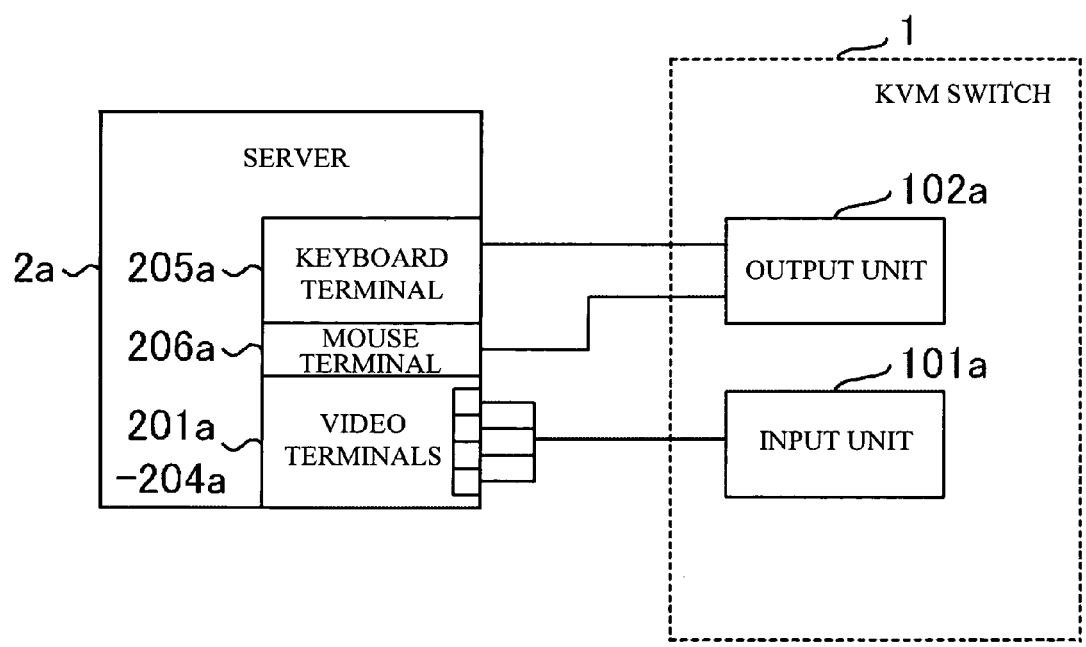
Figure 4:
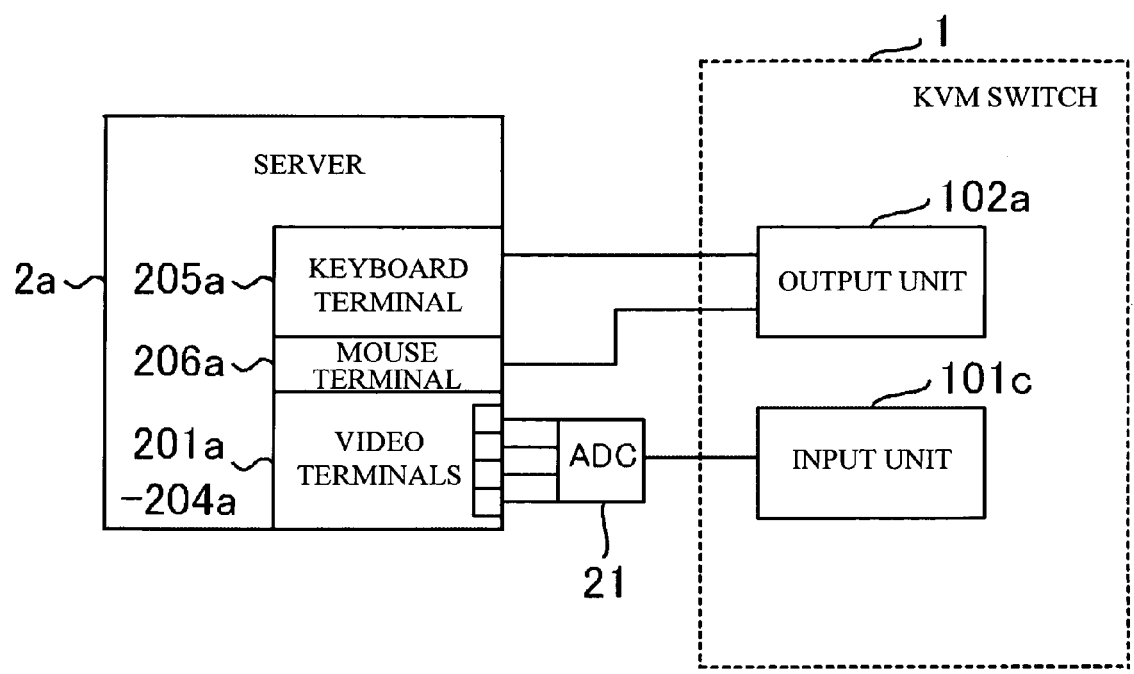

FIGS. 3 and 4 are schematic diagrams showing a connection state between the KVM switch 1 and the server 2a.

In FIG. 3, a plurality of cables connected to the video terminals are bundled in one cable, and the bundled cable is connected to the input unit 101a. The bundled cable is composed of the plurality of separated lines on the connection side to the video terminals 201a to 204a, and the single line on the connection side to the input unit 101a. This makes it possible to reduce the number of cables, and the user can easily confirm the connection between the KVM switch 1 and the server 2a.

Although a cable connected to the keyboard terminal 205a and a cable connected to the mouse terminal 206a are separated, a cable which composes a plurality of separated lines on the connection side to the keyboard terminal 205a, and a single line on the connection side to the output unit 102a may be used.

In FIG. 4, the plurality of cables connected to the video terminals 201a to 204a are connected to the input of an AD converter 21, and the output of the AD converter 21 is connected to an input unit 101c. It should be noted that a combination of the AD converter 21 and the input unit 101c exerts the same functions as the input unit 101a in FIG. 3. The plurality of video signals output from the video terminals 201a to 204a are converted into a single digital signal with the AD converter 21. The single digital signal is input to the input unit 101c. The number of cables can be reduced with the AD converter 21, and the user can easily confirm the connection between the KVM switch 1 and the server 2a.

Here, although the connection state between the KVM switch 1 and the server 2a is described, it is possible to connect between KVM switch 1 and server 2b in the same manner.

Figure 5:
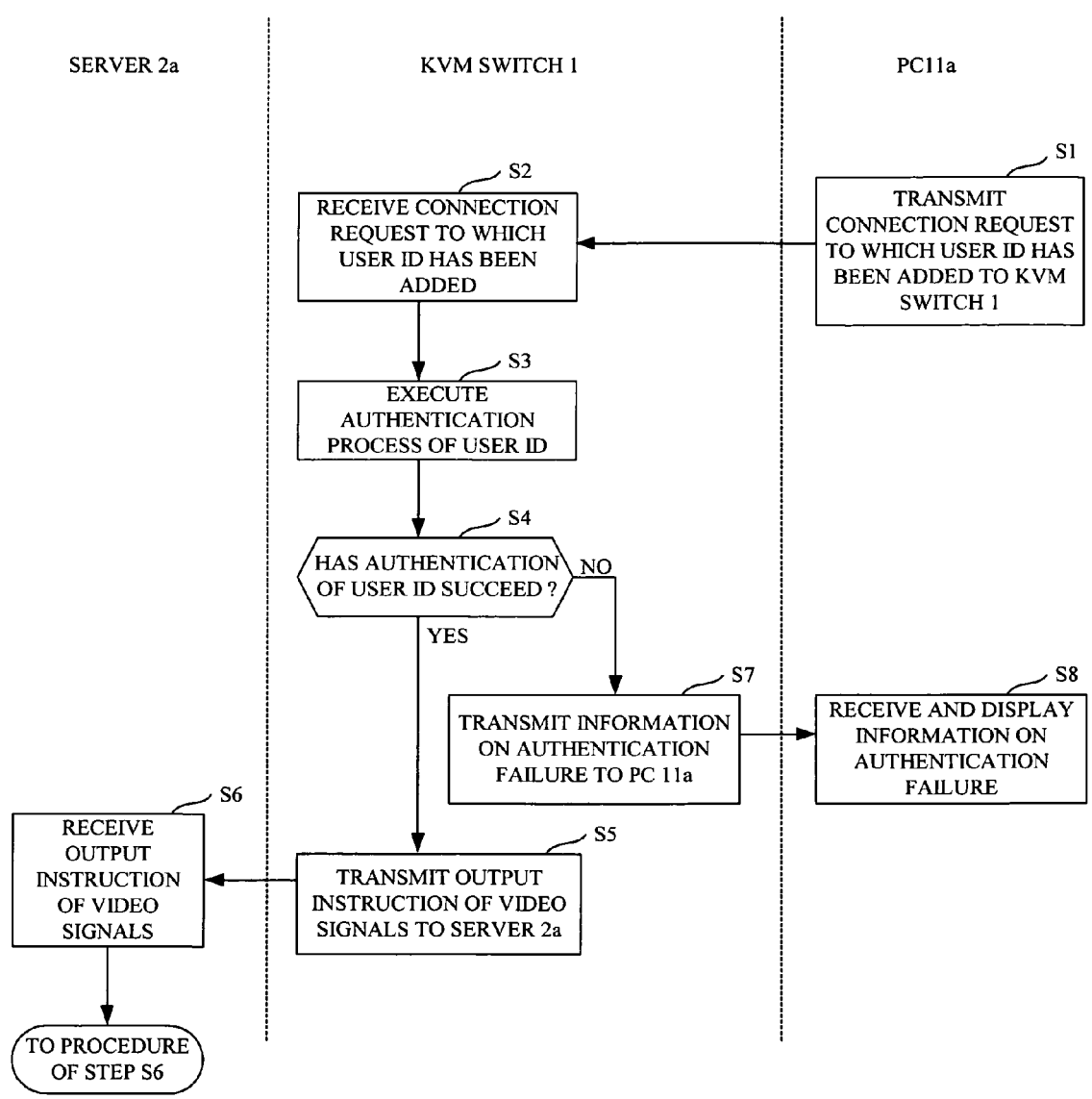
FIG. 5 is a flowchart showing a process in which the PC 11a connects to the server 2a via the KVM switch 1.

FIG. 5 is a flowchart showing a process in which the PC 11a connects to the server 2a via the KVM switch 1.

First, the PC 11a transmits a connection request for the server 2a, to which a user ID input via the input unit 153a has been added, to the KVM switch 1 (step S1).

The transmitting and receiving unit 105 of the KVM switch 1 receives the connection request to the server 2a, to which the user ID has been added (step S2). The controlling unit 104 executes an authentication process based on the user ID (step S3). The controlling unit 104 includes a list of user IDs accessible to each server, and compares the user ID added to the connection request with the user IDs included in the list to execute the authentication process.

Next, the controlling unit 104 determines whether the authentication of the user ID has succeed (step S4). In step S4, when the authentication of the user ID has succeed (YES), the controlling unit 104 transmits an output instruction of the video signals to the server 2a (step S5). The server receives the output instruction of the video signals (step S6). Then, the procedure proceeds to a process in FIG. 6, described later.

In step S4, When the authentication of the user ID has failed or a cancel instruction of the authentication of the user ID has been input (NO), the controlling unit 104 transmits information on authentication failure to the PC 11a via the transmitting and receiving unit 105 (step S7). The transmitting and receiving unit 150a of the PC 11a receives the information on authentication failure, and the display unit 152a displays the information on authentication failure (step S8).

Figure 6:
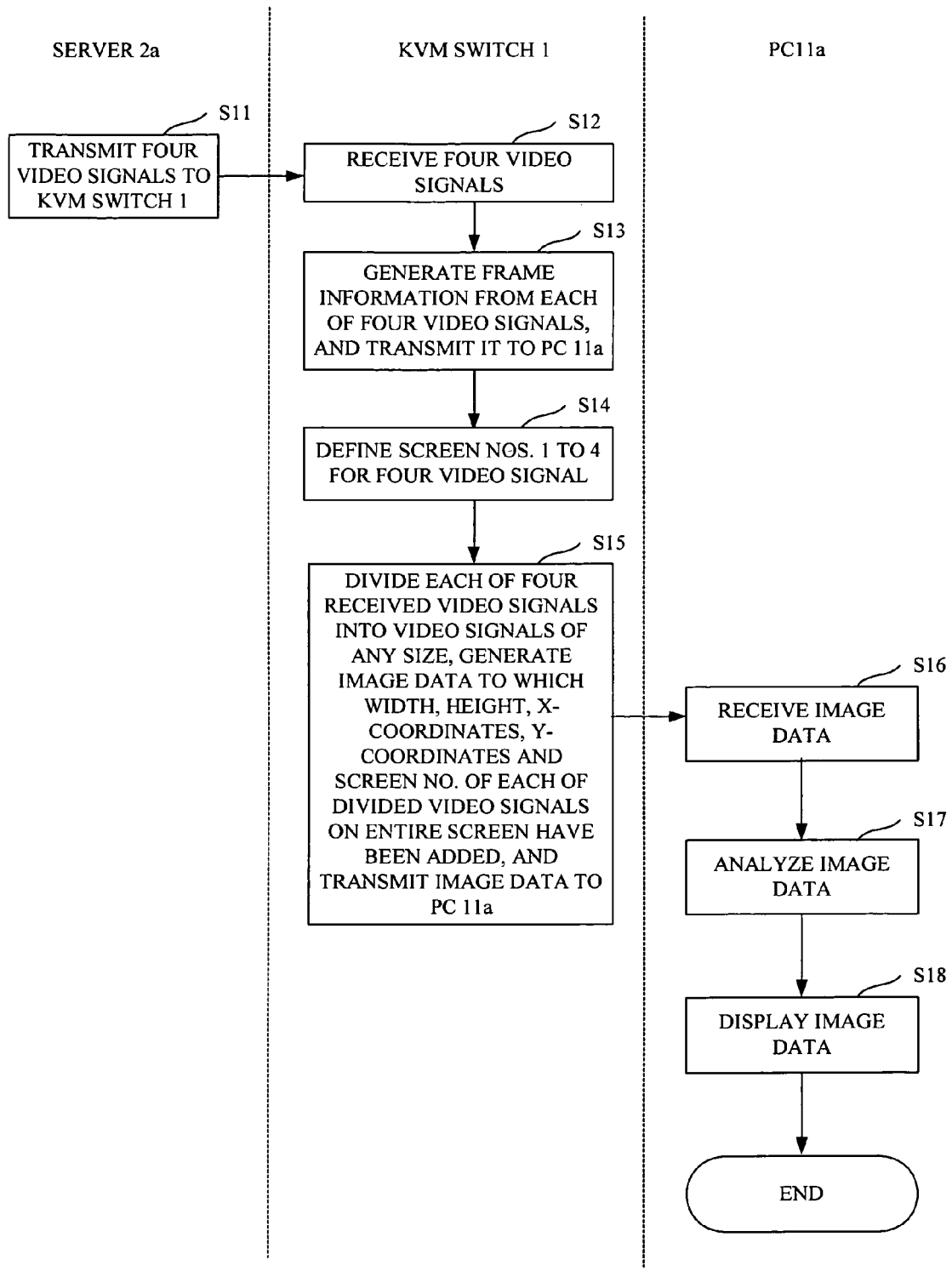
FIG. 6 is a flowchart showing a process in which video signals output from the server 2a are displayed on the PC 11a via the KVM switch 1.

FIG. 6 is a flowchart showing a process in which video signals output from the server 2a are displayed on the PC 11a via the KVM switch 1.

Figure 7:
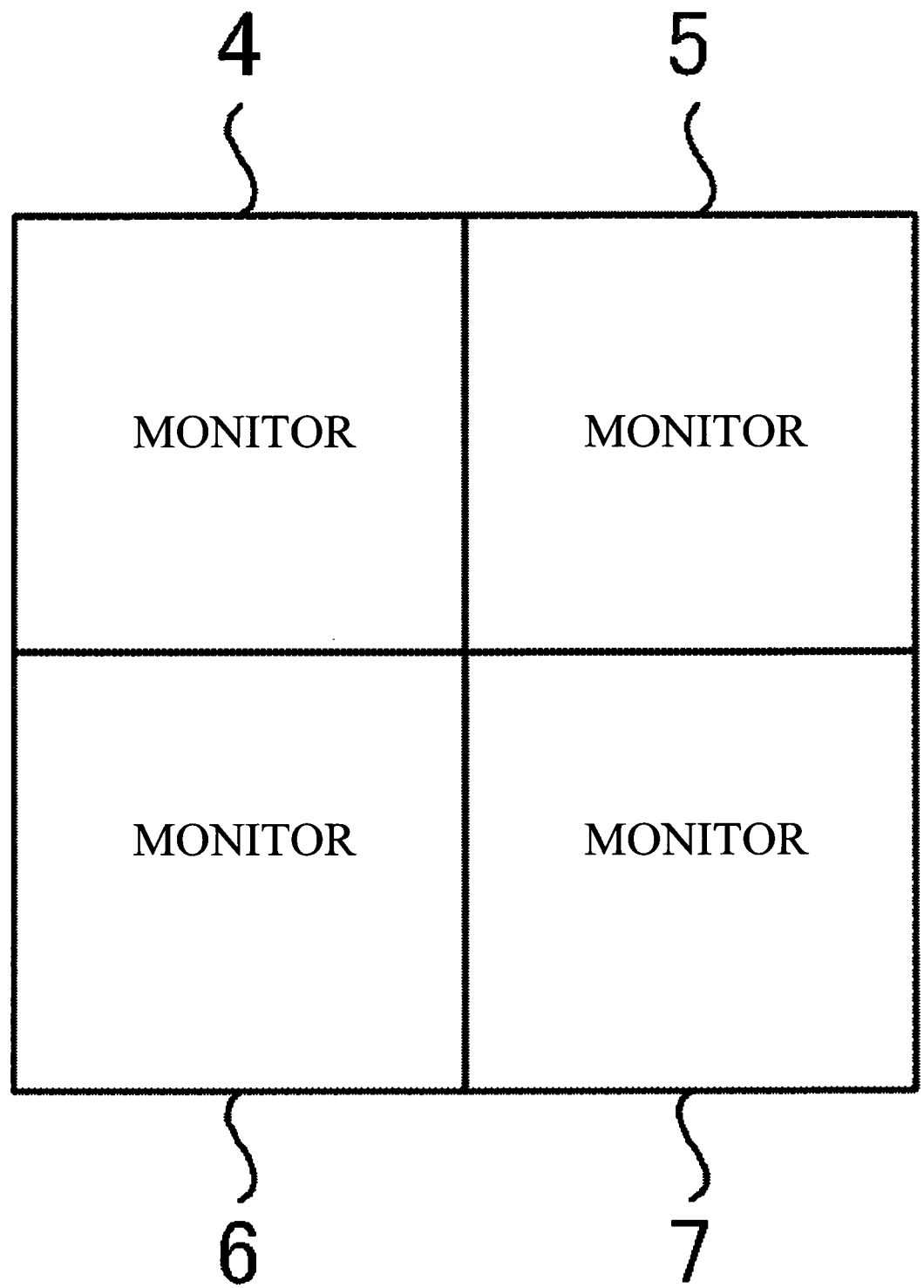

Here, FIG. 7 shows the configuration of a screen of the server 2a. The screen of the server 2a is a one set of the screens of the monitors 4 to 7, and the screen of this one set is displayed on the remote operating application. Screen data is equivalent to the pieces of the image data corresponding to the video signals output from server 2a.

The server 2a transmits four video signals from the video terminals 201a to 204a to the KVM switch 1 (step S11).

Figure 9:
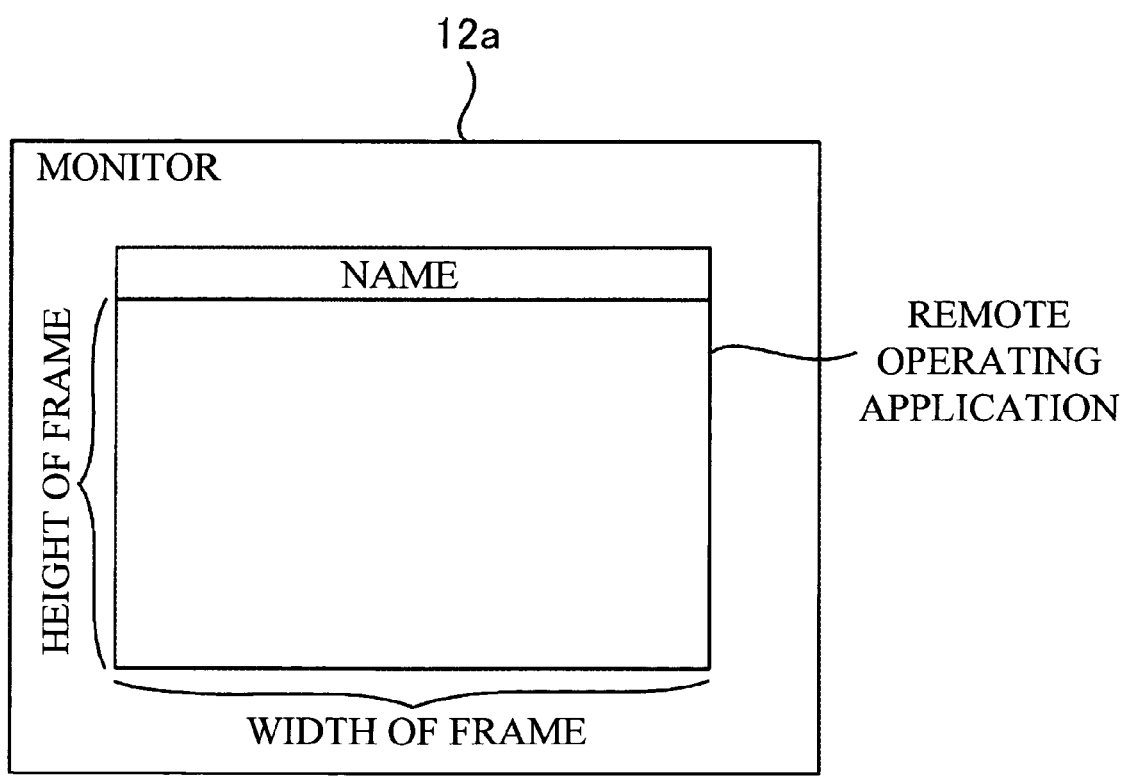
FIG. 9 is a diagram showing an example of a frame generated on a remote operating application.

The conversion processing unit 103 of the KVM switch 1 receives the four video signals via the input unit 101a (step S12). The conversion processing unit 103 generates frame information from each of the four video signals, and transmits the generated frame information to the PC 11a (step S13). As shown in FIG. 8, the frame information is composed of a packet, and includes a width of the frame, a height of the frame, the number of bits for each pixel, luminance, maximum luminance of a red signal, maximum luminance of a green signal, maximum luminance of a blue signal, a shift value of the red signal, a shift value of the green signal, a shift value of the blue signal, a name named to identify each server set to the KVM switch 1, and a length of the name. The PC 11a receives the frame information, and generates a frame shown in FIG. 9 on the executed remote operating application.

The conversion processing unit 103 defines screen Nos. 1 to 4 for the four video signal at the same time as generating the above-mentioned frame information (step S14). Here, since the entire screen is configured as shown in FIG. 7, the video signal which is output from the video terminal 201a and is displayed on the monitor 4 is defined as the screen No. 1, the video signal which is output from the video terminal 202a and is displayed on the monitor 5 is defined as the screen No. 2, the video signal which is output from the video terminal 203a and is displayed on the monitor 6 is defined as the screen No. 3, and the video signal which is output from the video terminal 204a and is displayed on the monitor 7 is defined as the screen No. 4.

Figure 10:
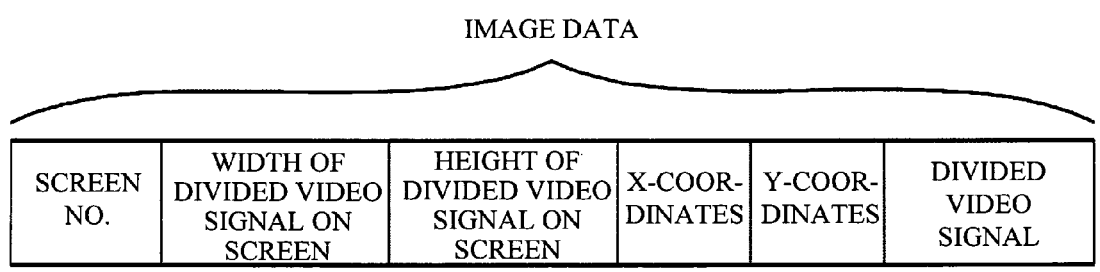
FIG. 10 is a diagram showing the data structure of image data.

Next, the conversion processing unit 103 divides each of the four received video signal into any size, e.g. a data size of 16×16 pixels, adds a width, a height, x-coordinates (i.e., x-coordinates of an edge point in the upper right of the divided video signal), y-coordinates (i.e., y-coordinates of an edge point in the upper right of the divided video signal) and the screen No. of each of the divided video signal on the entire screen to the corresponding divided video signal, generates image data as shown in FIG. 10, and transmits the image data to the transmitting and receiving unit 105. The transmitting and receiving unit 105 transmits the image data to the PC 11a (step S15).

The width and the height of the divided data on the entire screen designate a display size on the screen of the PC 11a. The x-coordinates (i.e., x-coordinates of an edge point in the upper right of the divided data) and the y-coordinates (i.e., y-coordinates of an edge point in the upper right of the divided data) designate a display position on the screen of the PC 11a. The screen No. designates type information of the video signal (i.e., information that shows from which video terminal the video signal is output).

This makes it possible to decide the display position and the display size of the image data on the screen of the PC 11a, the image data corresponding to each of the video signals input from the input unit 101a or 101b.

Figure 11:
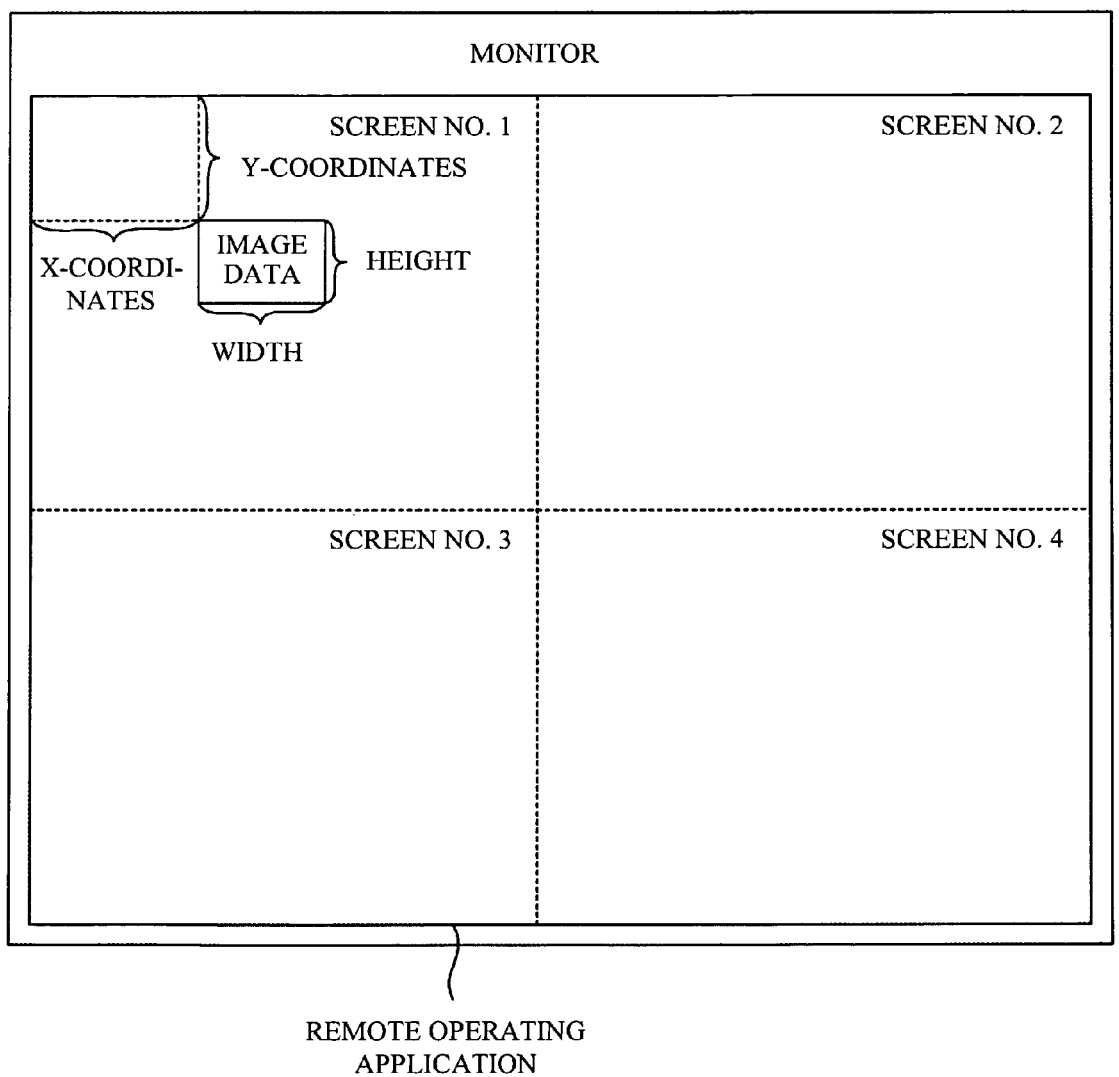
FIG. 11 is a diagram showing an example of the image data displayed on the remote operating application.

The PC 11a receives the image data from the conversion processing unit 103 (step S16). The controlling unit 151a of the PC 11a analyzes the image data on the remote operating application (step S17), acquires information of the width, the height, x-coordinates and y-coordinates of the screen to be displayed, and displays the image data as shown in FIG. 11 (step S18). The process is terminated. The PC 11a repeats the procedures of steps S16 to S18, and generates the screen data in which the screen of the server 2a, i.e., the screens of the monitors 4 to 7 are a single set, on the remote operating application.

Figure 12:
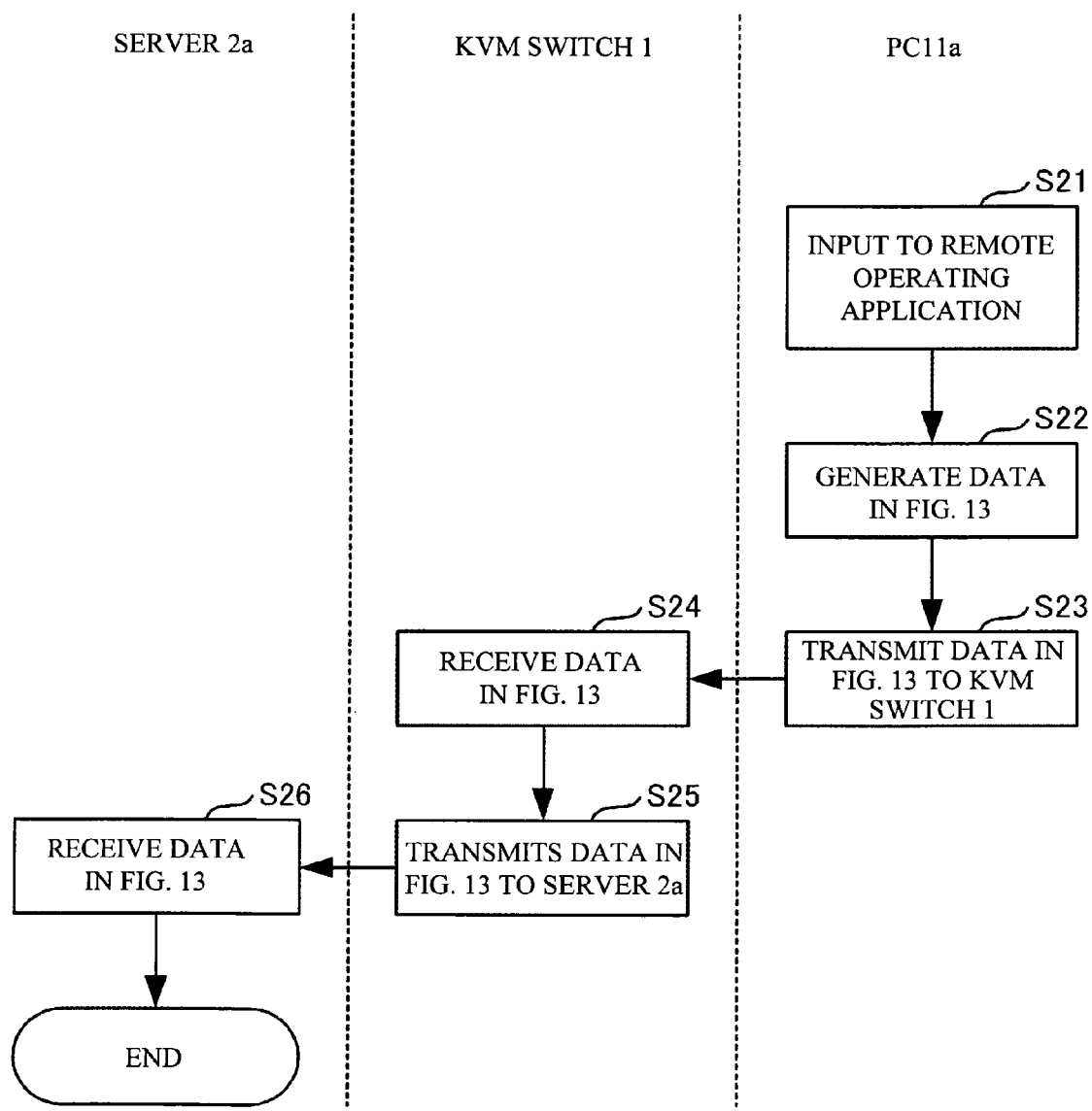
FIG. 12 is a flowchart showing a process in which key data of a keyboard 13a input from the remote operating application in the PC 11a is transmitted to the server 2a via the KVM switch 1.

FIG. 12 is a flowchart showing a process in which key data of the keyboard 13a input from the remote operating application in the PC 11a is transmitted to the server 2a via the KVM switch 1.

Figure 13:
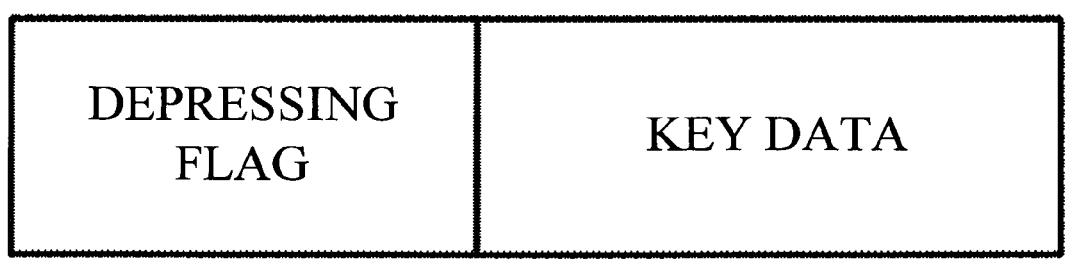

In the PC 11a, when the key data from the keyboard 13a is input to the remote operating application (step S21), the controlling unit 151a generates data in FIG. 13 (step S22), and transmits the data to the KVM switch 1 via the transmitting and receiving unit 150a (step S23). It should be noted that the data in FIG. 13 may be packetized.

The transmitting and receiving unit 105 of the KVM switch 1 receives the data in FIG. 13 (step S24), and the controlling unit 104 transmits the data in FIG. 13 to the server 2a via the output unit 102a (step S25). The server 2a receives the data in FIG. 13 via the keyboard terminal 205a (step S26). The process is terminated.

Figure 14:
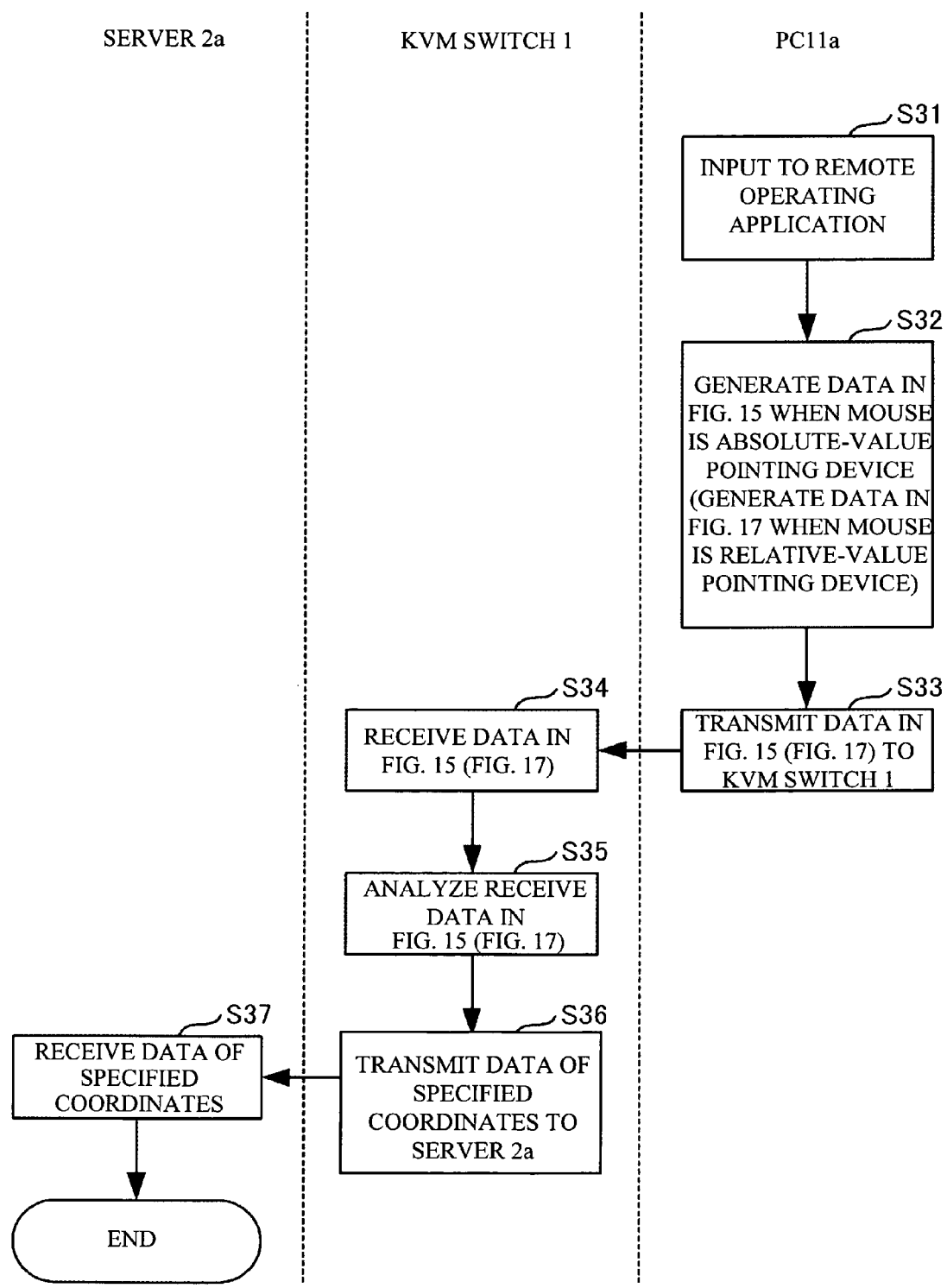
FIG. 14 is a flowchart showing a process in which mouse data of a mouse 14a input from the remote operating application in the PC 11a is transmitted to the server 2a via the KVM switch 1.

FIG. 14 is a flowchart showing a process in which mouse data of the mouse 14a input from the remote operating application in the PC 11a is transmitted to the server 2a via the KVM switch 1.

In the PC 11a, when the mouse data from the mouse 14a is input to the remote operating application (step S31), the controlling unit 151a generates data in FIG. 15 (step S32), and transmits the data to the KVM switch 1 via the transmitting and receiving unit 150a (step S33). It should be noted that the data in FIG. 15 may be packetized.

The transmitting and receiving unit 105 of the KVM switch 1 receives the data in FIG. 15 (step S34), and the controlling unit 104 analyzes the data in FIG. 15 (step S35).

Figure 16:
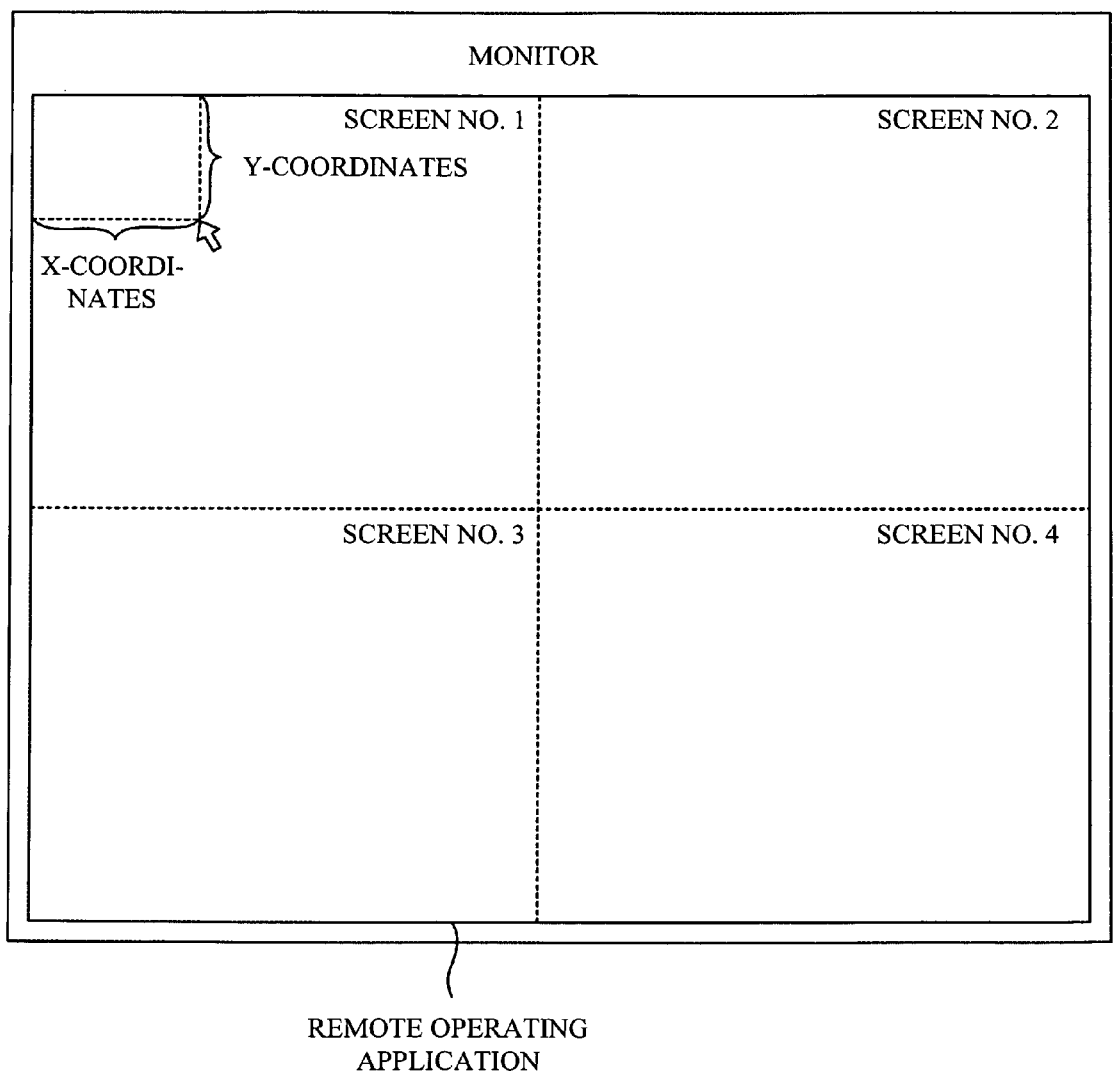
FIG. 16 is a diagram showing a state where the position of an absolute-value pointing device is specified.

When the mouse 14a is an absolute-value pointing device, the controlling unit 104 specifies the input coordinates as shown in FIG. 16 from the screen No., the x-coordinates, and the y-coordinates included in the data in FIG. 15. The output unit 102a transmits data of the specified coordinates to the server 2a (step S36). The server 2a receives the data of the specified coordinates via the mouse terminal 206a (step S37). The process is terminated. The absolute-value pointing device is limited to the mouse, and may be a touch panel.

Figure 18:
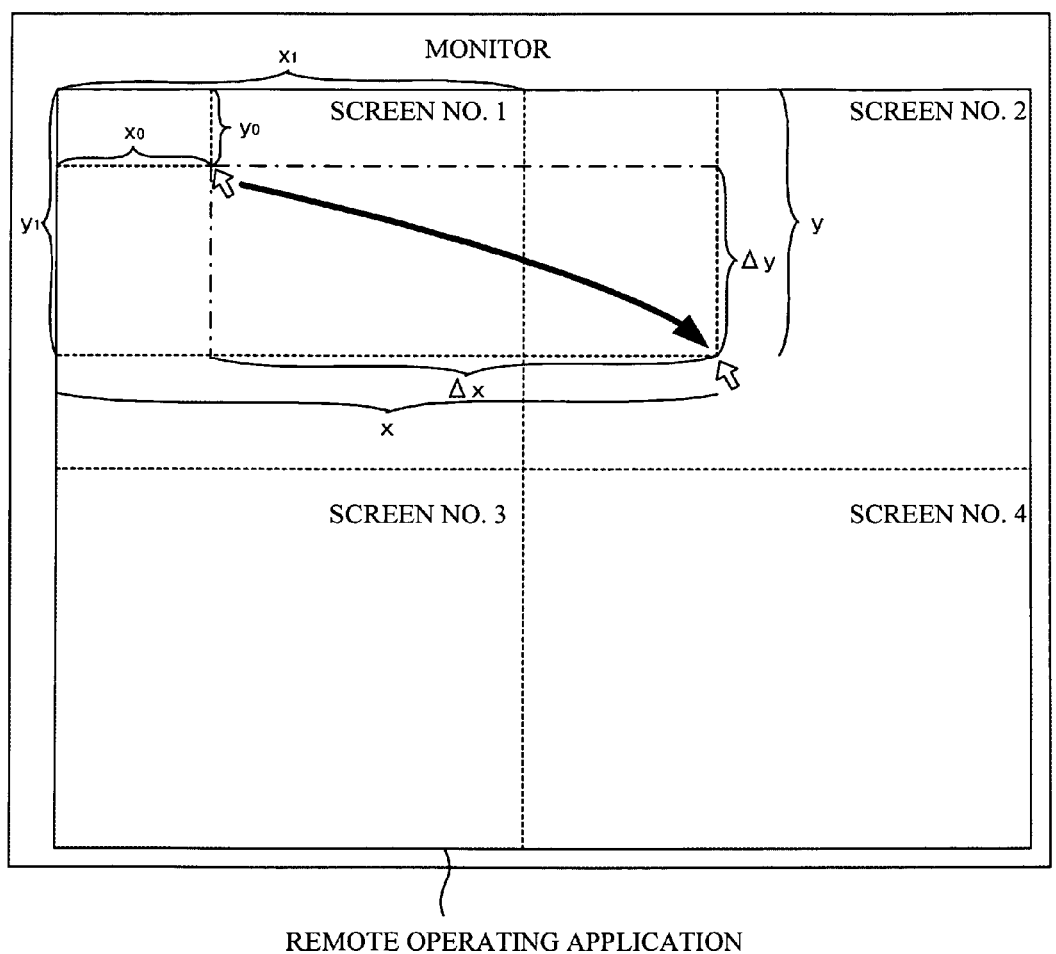
FIG. 18 is a diagram showing a state where the position of a relative-value pointing device is specified.

When the mouse 14a is a relative-value pointing device, in step S32, the controlling unit 151a generates data in FIG. 17. The controlling unit 104 of the KVM switch 1 analyzes the data in FIG. 17. The controlling unit 104 calculates x-coordinates and y-coordinates according to the following equations, and specifies coordinates input to the mouse 14a as shown in FIG. 18. The output unit 102a transmits data of the specified coordinates to the server 2a.

$x = x_0 \Delta x$ (If $x_0 + \Delta x <= x_1$)  Equation 1)

$x = x_0 + \Delta x - x_1$ (If $x_0 + \Delta x > x_1$)  Equation 2)

$y = y_0 + \Delta y$ (If $y_0 + \Delta y <= y_1$)  Equation 3)

$y = y_0 + \Delta y - y_1$ (If $y_0 + \Delta y > y_1$)  Equation 4)

Thus, the server 2a can input data output according to the operation of the keyboard, the mouse or the touch panel connected to the PC 11a. The server 2b also can input the data output according to the operation of the keyboard, the mouse or the touch panel connected to the PC 11a.

A description will now be given of a switching process between the servers. Here, the description will be given of the case of switching from the server 2a to the server 2b.

Figure 19:
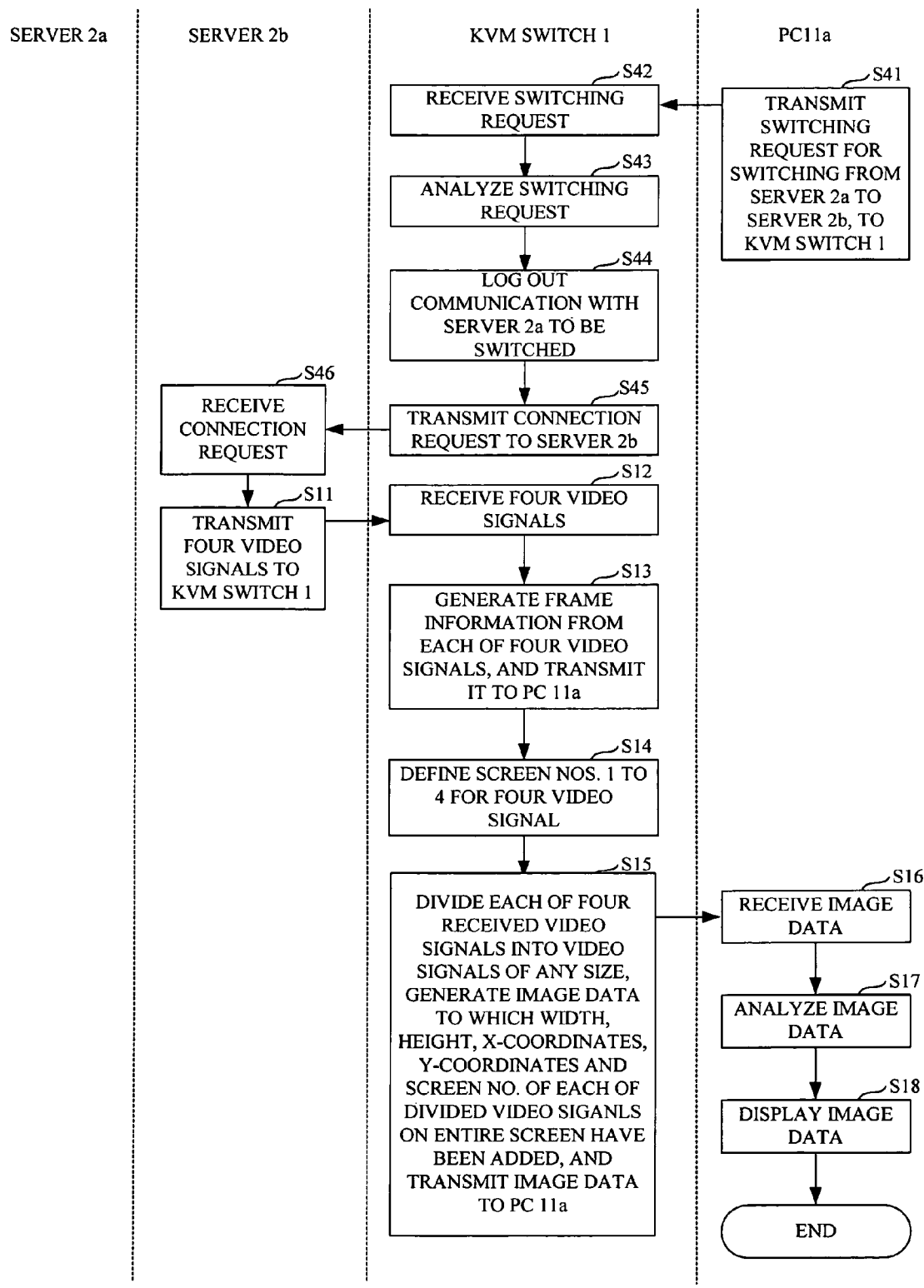
FIG. 19 is a flowchart showing a switching process between the servers.

FIG. 19 is a flowchart showing the switching process between the servers.

Figure 20:
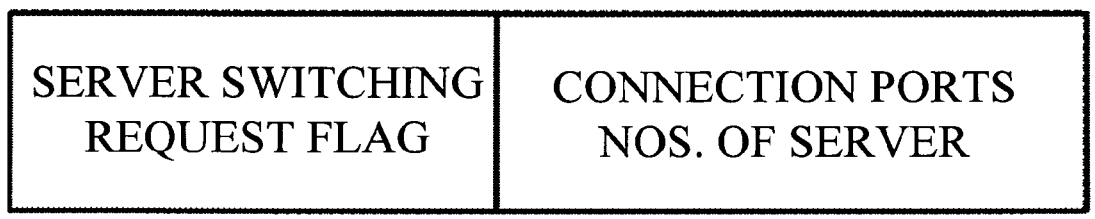
FIG. 20 is a diagram showing an example of data of a switching request.

First, when the user of the PC 11a inputs a hot key for switching one server (i.e., server 2a) to another server (i.e., server 2b) from the keyboard 13a, or selects a target server (i.e., server 2b) from a menu of the remote operating application or server information previously stored into the PC 11a, the controlling unit 151a of the PC 11a transmits a switching request for switching from the server 2a to the server 2b, to the KVM switch 1 (step S41). At this time, the controlling unit 151a transmits a packet of data as shown in FIG. 20 to the KVM switch 1. A "connection ports Nos. of the server" in FIG. 20 designates numbers of the keyboard terminal, the mouse terminal, and the video terminals of the target server (i.e., the server of switched destination).

Next, the KVM switch 1 receives the switching request from the PC 11a via the transmitting and receiving unit 105 (step S42), and the controlling unit 104 analyzes the switching request (step S43). Specifically, the controlling unit 104 determines that the switching request for switching one server (i.e., server 2a) to another server (i.e., server 2b) has been received based on a "server switching request flag" in FIG. 20, and specifies the keyboard terminal, the mouse terminal, and the video terminals of the target server according to the "connection ports Nos. of the server" in FIG. 20.

Next, the controlling unit 104 logs out the communication with the server 2a to be switched (step S44). That is, the controlling unit 104 stops data communication with the input unit 101a and the output unit 102a, and starts data communication with the input unit 101b and the output unit 102b.

Next, the controlling unit 104 transmits a connection request to the server 2b (step S45). The server 2b receives the connection request from the KVM switch 1 (step S46). The following procedures are the same as the procedures in FIG. 6, and description thereof is omitted.

According to the present process, when the transmitting and receiving unit 105 receives the switching request for switching from the server 2a to the server 2b from the PC 11a, the controlling unit 104 switches the plurality of video signals input from the input unit 101a to the plurality of video signals input from the input unit 101b. Therefore, it is possible to smoothly switch the plurality of video signals that are output from each server, and correspond to the plurality of pieces of image data displayed on the PC 11a.

Since the PC 11a is connected to the KVM switch 1 via the network 10, it is possible to smoothly switch the plurality of video signals that are output from each server, and correspond to the plurality of pieces of image data displayed on the PC 11a via the network 10.

Further, when the transmitting and receiving unit 105 receives the switching request for switching from the server 2a to the server 2b from the PC 11a, the controlling unit 104 switches output resource of the key data or the mouse data received from the PC 11a from the output unit 102a to the output unit 102b. Therefore, it is possible to switch the output resource of the key data or the mouse data received from the PC 11a at the same time as switching the plurality of video signals output from the server 2a A description will now be given of a replacement process of screen positions.

Figure 21:
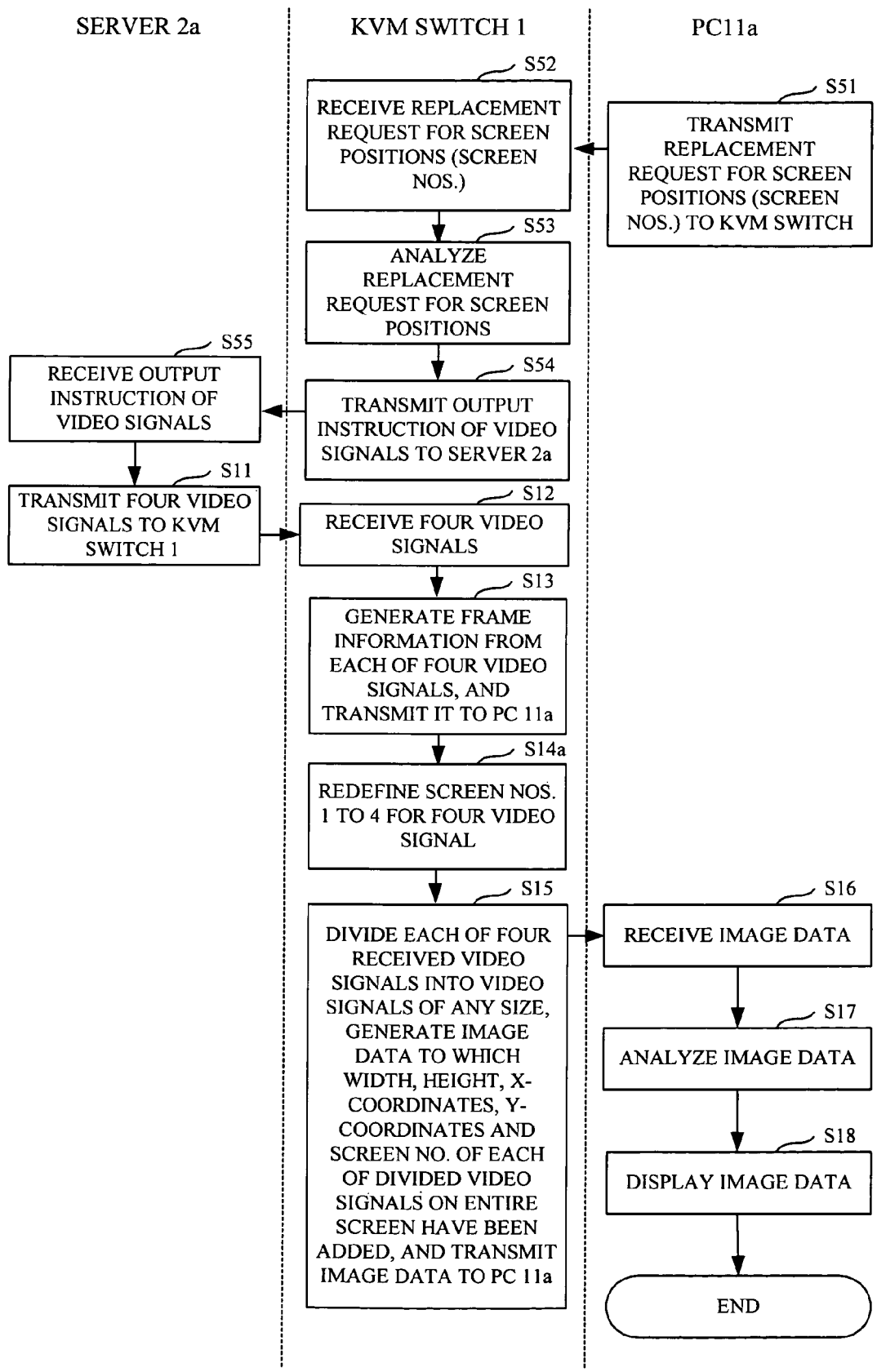
FIG. 21 is a flowchart showing a replacement process of screen positions.

FIG. 21 is a flowchart showing the replacement process of screen positions.

Figure 22:
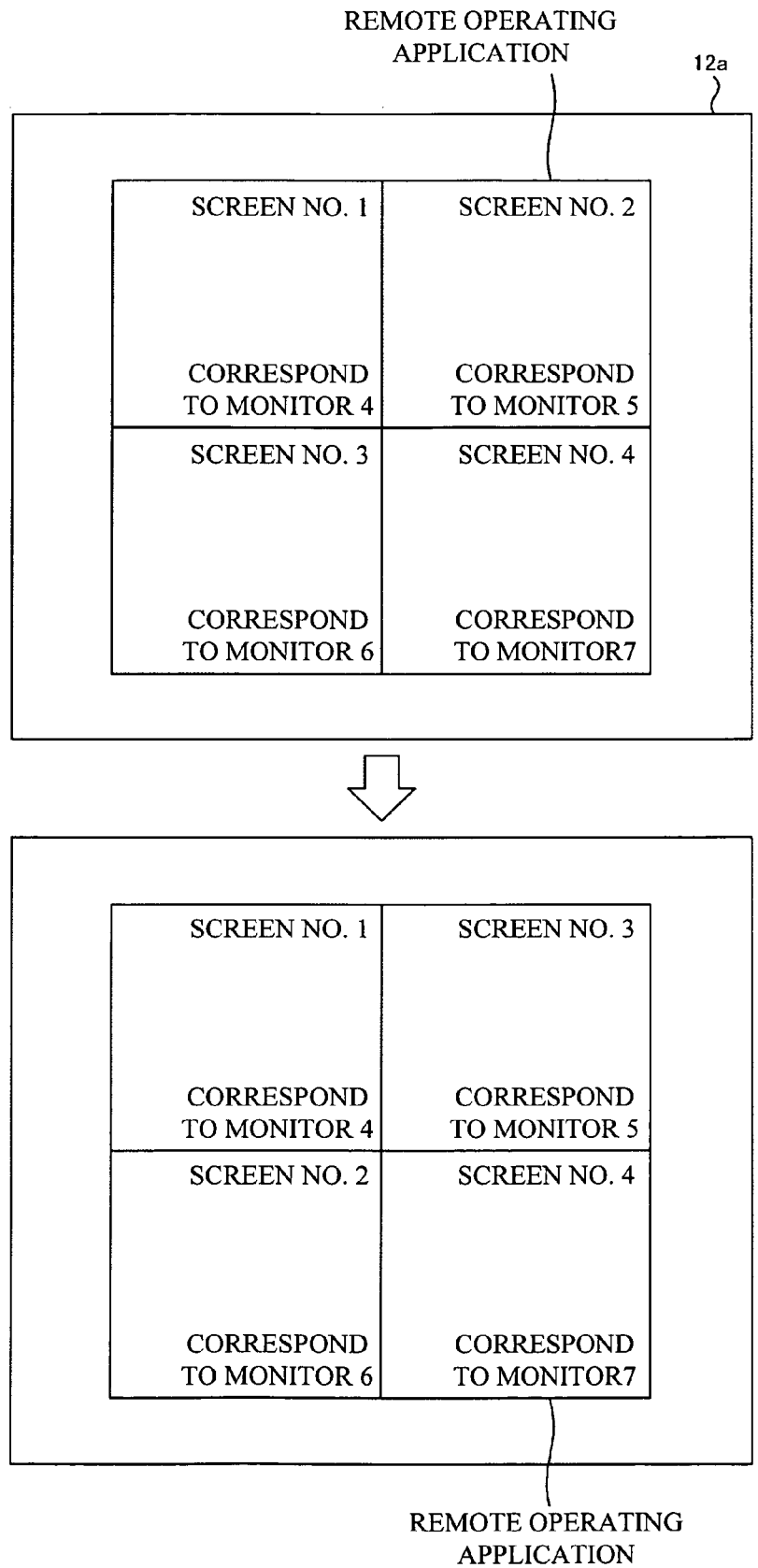
FIG. 22 is a diagram showing a state of replacement between a screen No. 2 and a screen No. 3.

First, when the user of the PC 11a sets the replacement of the screen position on the remote operating application, the controlling unit 151a of the PC 11a transmits a replacement request for the screen positions (screen Nos.) to the KVM switch 1 (step S51). Here, it is assumed that, as shown in FIG. 22, the replacement request for the screens of the monitors 5 and 6 (i.e., screen Nos. 2 and 3) is transmitted. At this time, the controlling unit 151a transmits a packet of data as shown in FIG. 23 to the KVM switch 1.

The KVM switch 1 receives the replacement request for the screen positions from the PC 11a via the transmitting and receiving unit 105 (step S52), and the controlling unit 104 analyzes the replacement request for the screen positions (step S53). Specifically, the controlling unit 104 determines that the replacement request for the screen positions has been received based on a "replacement request flag for the screen positions" in FIG. 23, and specifies the screen Nos. of replacement objects according to a "screen No. 2→screen No. 3" and a "screen No. 3→screen No. 2" in FIG. 23.

Then, the controlling unit 104 transmits an output instruction of the video signals to the server 2a (step S54). The server 2a receives the output instruction of the video signals (step S55). After this, the procedure proceeds to the above-mentioned process in FIG. 6.

In this regard, on behalf of the procedure in step S14, the conversion processing unit 103 redefines the screen Nos. 1 to 4 for the four video signal at the same time as generating the frame information in step S13 (step S114a). Here, since the user requests the screen configuration as shown in FIG. 22, the video signal output from the video terminal 201a is defined as the screen No. 1, the video signal output from the video terminal 202a is defined as the screen No. 2, the video signal output from the video terminal 203a is defined as the screen No. 3, and the video signal output from the video terminal 204a is defined as the screen No. 4, for example.

According to the present process, the PC 11a transmits the request for replacing the positions of the plurality of pieces of image data displayed on the remote operating application to the KVM switch 1 (step S51), the transmitting and receiving unit 105 receives the request for replacing the positions of the plurality of pieces of image data (step S52), the conversion processing unit 103 replaces the positions of the plurality of pieces of image data displayed on the remote operating application based on the request (step S14a), and the transmitting and receiving unit 105 transmits the plurality of pieces of image data in which the positions thereof have replaced, to the PC switch 1.

A description will now be given of a changing process of the number of display screens.

Figure 24:
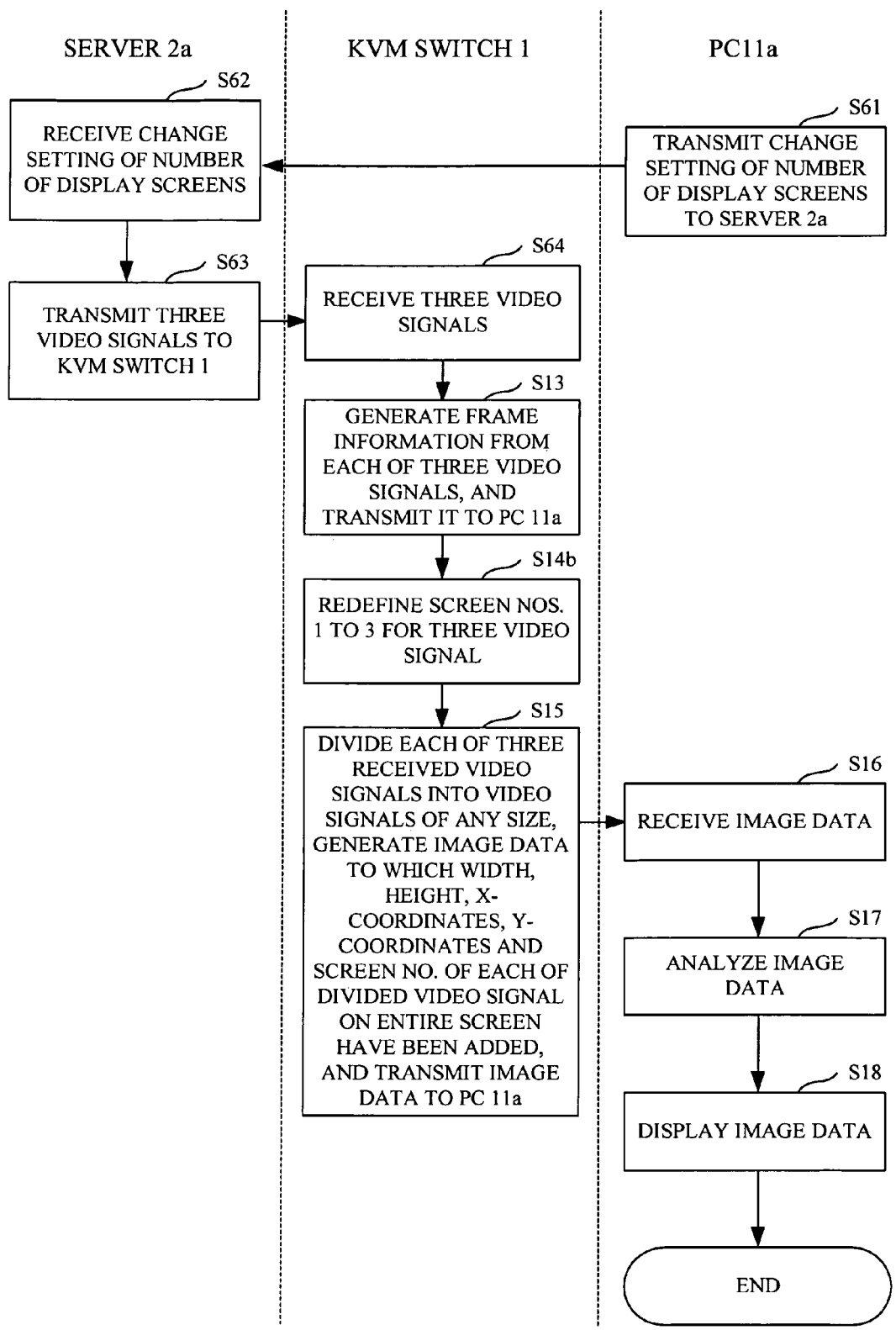
FIG. 24 is a flowchart showing a changing process of the number of display screens.

FIG. 24 is a flowchart showing the changing process of the number of display screens.

Figure 25:
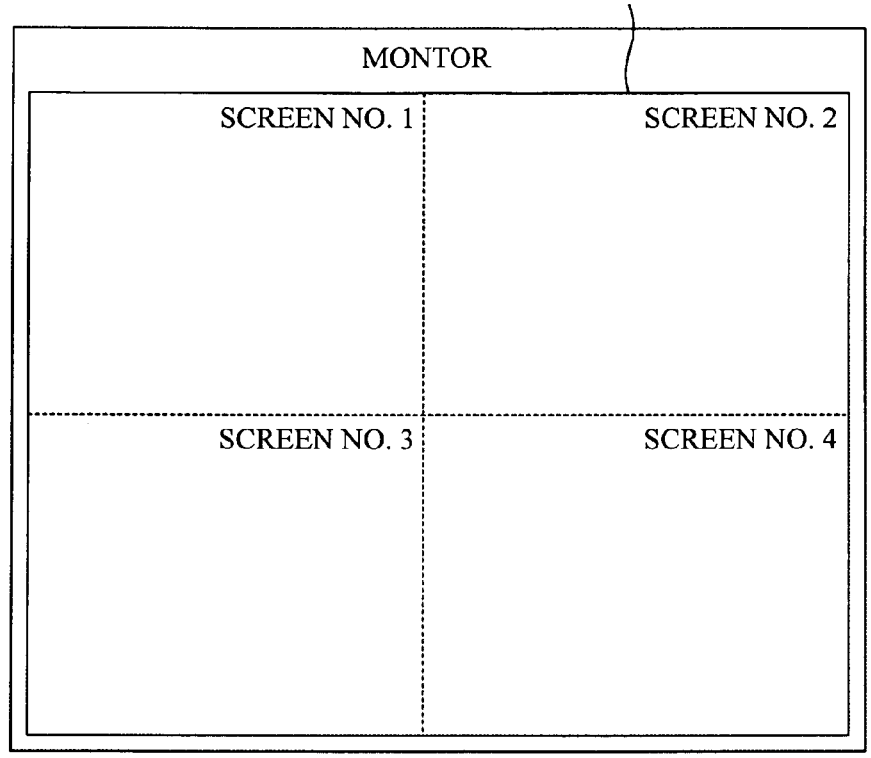
FIG. 25 is a diagram showing an example of the change of the number of screens displayed on the remote operating application.
Figure 25:
Figure 25:
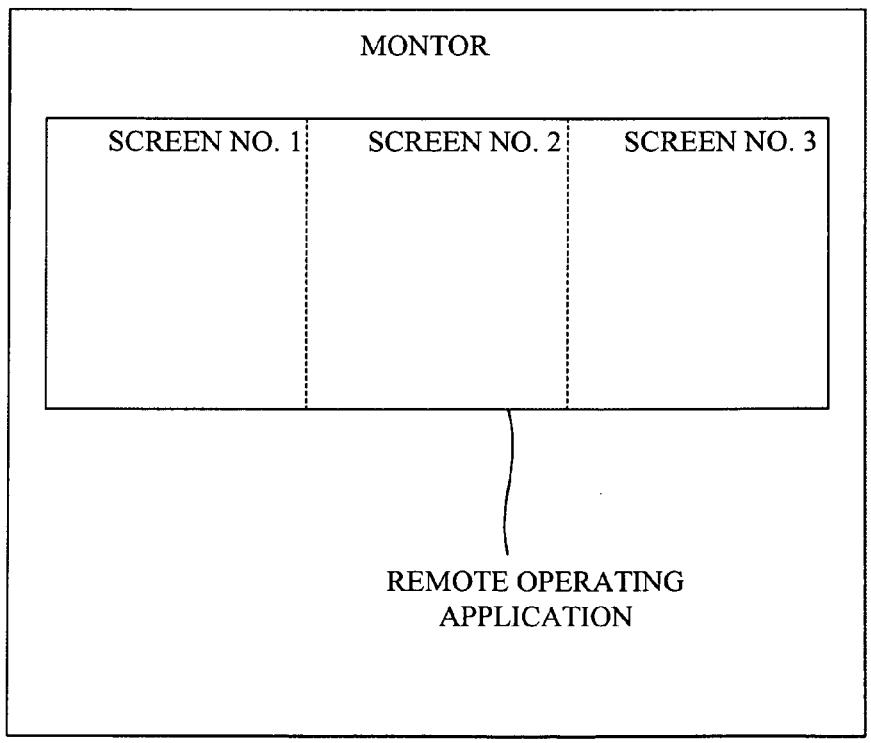

Here, it is assumed that four screens are displayed on the remote operating application. The present process changes the number of display screens so that three screens are displayed on the remote operating application as shown in FIG. 25.

First, when the user of the PC 11a sets the change of the number of display screens (e.g. three display screens) on the remote operating application, the controlling unit 151a of the PC 11a transmits the change setting of the number of display screens to the server 2a via the KVM switch 1 (step S61).

The server 2a receives the change setting of the number of display screens (step S62). The server 2a transmits the three video signals to the KVM switch 1 based on the received change setting of the number of display screens (step S63). The conversion processing unit 103 of the KVM switch 1 receives the three video signals via the input unit 101a (step S64). Then, the procedure proceeds to steps S13 to S18 described in FIG. 6.

Although in step S13, the conversion processing unit 103 generates the frame information from each of the video signals, the width and the height of the frame included in the frame information are decided based on the changed number of display screens.

On the behalf of step S14, the conversion processing unit 103 redefines the screen Nos. 1 to 3 for the three video signal at the same time as generating the frame information in step S13 (step S14b). Here, since the user requests the screen configuration as shown in FIG. 25, the video signal output from the video terminal 201a is defined as the screen No. 1, the video signal output from the video terminal 202a is defined as the screen No. 2, and the video signal output from the video terminal 203a is defined as the screen No. 3, for example.

According to the present process, the PC 11a transmits a request for changing the number of pieces of the image data displayed on the remote operating application to the server 2a via the KVM switch 1 (step S61), the server 2a outputs the video signals of the number corresponding to the request to the KVM switch 1 (step S63), the conversion processing unit 103 converts the video signals of the number corresponding to the request into the pieces of the image data which can be displayed on the remote operating application, and changes the display positions of the pieces of the converted image data on the remote operating application (steps S13 and S14b), and the transmitting and receiving unit 105 transmits the pieces of the image data in which the display positions thereof have changed to the PC 11a (step S15). Therefore, the PC 11a can change the number of pieces of the image data displayed on the remote operating application.

Even if the PC 11a transmits the request for changing the number of pieces of the image data displayed on the remote operating application to the server 2b, the above-mentioned process is executed.

A description will now be given of an update process of difference images.

Figure 26:
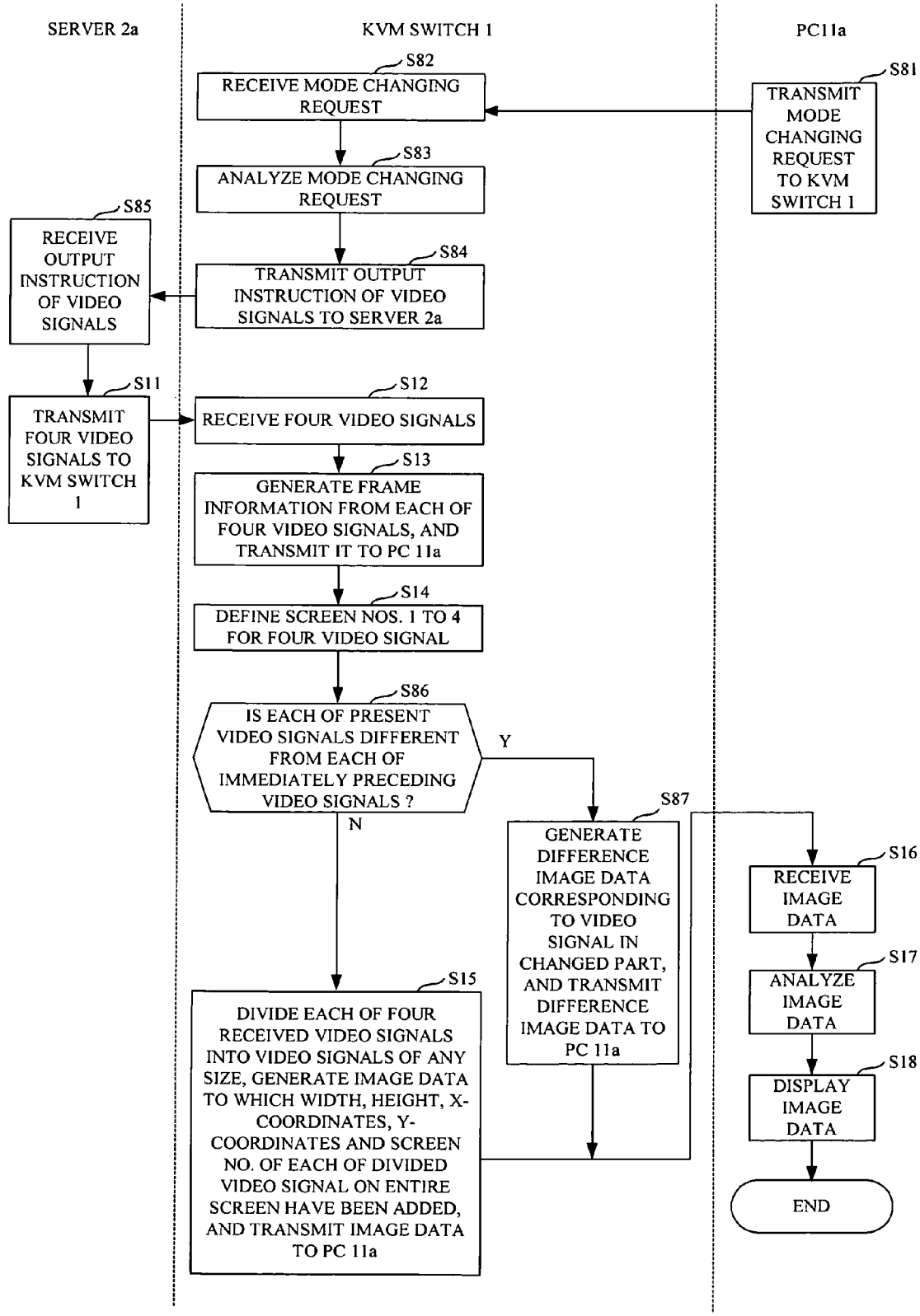
FIG. 26 is a flowchart showing an update process of difference images.

FIG. 26 is a flowchart showing the update process of difference images. The present process reduces an amount of transmission of the pieces of the image data by transmitting only differences of the video signals from the server 2a to the PC 11a.

Figure 27:
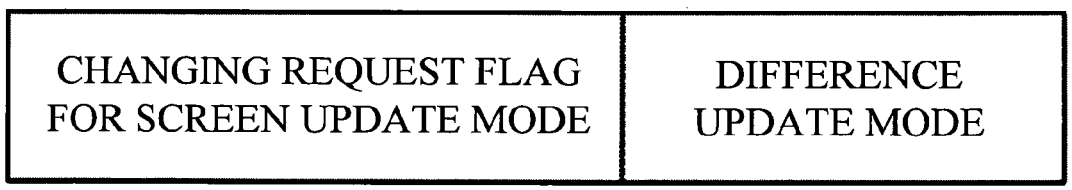
FIG. 27 is a diagram showing an example of data of the changing request in the screen update mode.

First, when the user of the PC 11a sets the change of a screen update mode from a normal update mode to a difference update mode in which only the differences of the pieces of the image data are received, on the remote operating application, the controlling unit 151a of the PC 11a transmits a mode changing request to the KVM switch 1 (step S81). At this time, the controlling unit 151a transmits a packet of data as shown in FIG. 27 to the KVM switch 1.

The KVM switch 1 receives the mode changing request from the PC 11a via the transmitting and receiving unit 105 (step S82), and the controlling unit 104 analyzes the mode changing request (step S83). Specifically, the controlling unit 104 determines that the changing request for the screen update mode has been received based on a "changing request flag for the screen update mode" in FIG. 27, and specifies a target mode (i.e., a mode of a changed destination) according to a "difference update mode" in FIG. 27. At this time, the KVM switch 1 is set to the difference update mode.

Then, the controlling unit 104 transmits an output instruction of the video signals to the server 2a (step S84). The server 2a receives the output instruction of the video signals (step S85). Then, the procedure proceeds to steps S11 to S18 described in FIG. 6.

After the procedure in step S14, the conversion processing unit 103 determines whether each of the present video signals received from the server 2a (i.e. input from the server 2a) is different from each of the corresponding video signals received just before the present video signals, i.e., each of the present video signals displayed on the frames is different from each of the immediately preceding video signals displayed on the same frames (step S86).

When the answer to the determination of step S86 is "NO", the procedure proceeds to step S15. On the other hand, when the answer to the determination of step S86 is "YES", the conversion processing unit 103 generates difference image data corresponding to video signal in a changed part, and transmits the difference image data to the transmitting and receiving unit 105. Then, the transmitting and receiving unit 105 transmits the difference image data to the PC 11a (step S87). Specifically, the conversion processing unit 103 divides the video signal in the changed part into any size, e.g. a data size of 16×16 pixels, and adds a width, a height, x-coordinates (i.e., x-coordinates of an edge point in the upper right of each divided video signal), y-coordinates (i.e., y-coordinates of an edge point in the upper right of each divided video signal) and the screen No. of each divided video signal on the entire screen to the corresponding divided video signal to thereby generate the difference image data. Therefore, only the difference image data corresponding to the video signal in the changed part is transmitted to the PC 11a.

According to the present process, the PC 11a transmits a request for receiving the differences between the pieces of the present image data and the pieces of the immediately preceding image data displayed on the remote operating application, to the KVM switch 1 (step S81), and the transmitting and receiving unit 105 receives the request from the PC 11a (step S82). The conversion processing unit 103 detects the difference between the present video signal and the immediately preceding video signal with respect to each of the video signals input from the input unit 101a, and converts the video signal corresponding to the difference into the difference image data which can be displayed with the PC 11a (steps S86 and S87). Then, the transmitting and receiving unit 105 transmit the converted difference image data to the PC 11a (step S87).

Therefore, the present process can reduce the amount of transmission of the pieces of the image data transmitted to the PC 11a, and hence the display of the pieces of the image data in the PC 11a is smoothly updated. Further, the load to the network can be reduced.

It should be noted that the input source of the plurality of video signals may be the input unit 101b.

A description will now be given of an update process of mirror display of the image data.

Figure 28:
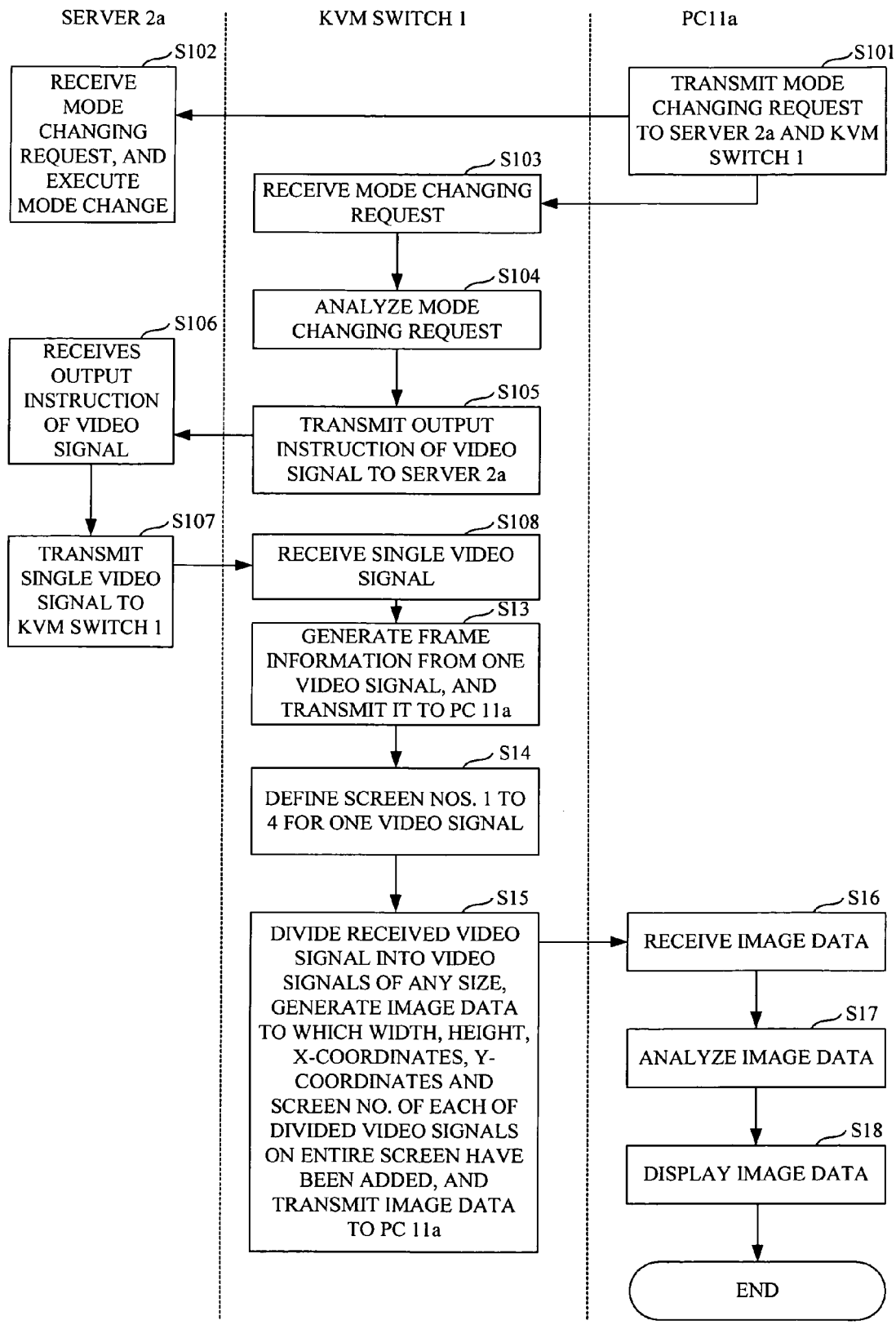
FIG. 28 is a flowchart showing an update process of mirror display of the image data.
Figure 29:
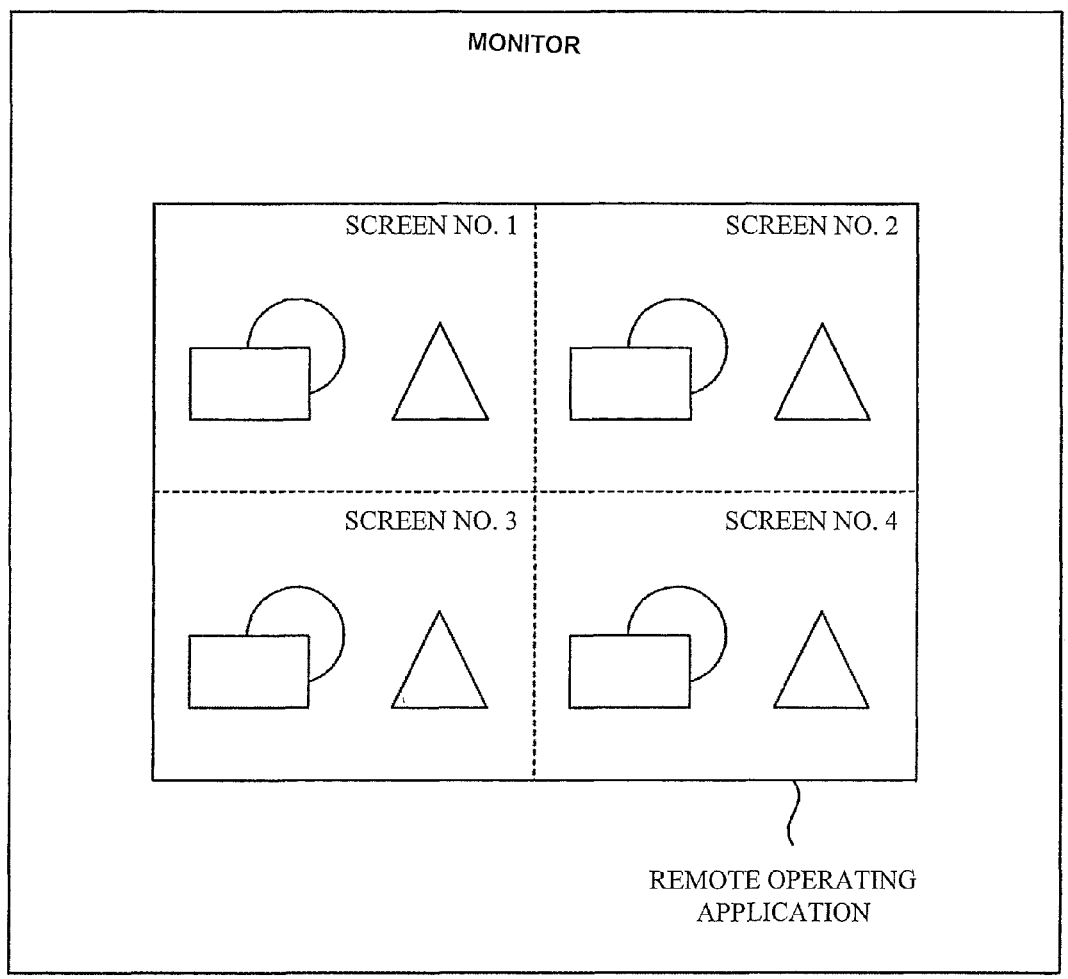
FIG. 29 is a diagram showing an example of the mirror display in which single image data is output to the plurality of screens.

FIG. 28 is a flowchart showing the update process of mirror display of the image data. The mirror display designates a display form in which single image data is output to the plurality of screens, as illustrated in FIG. 29.

First, when the user of the PC 11a sets the change of the screen update mode from the normal update mode to a mirror display update mode, the controlling unit 151a of the PC 11a transmits a mode changing request to the server 2a and the KVM switch 1 (step S101). At this time, the controlling unit 151a transmits a packet of data as shown in FIG. 30 to the KVM switch 1. The packet of data in FIG. 30 is a request for outputting the image data of the screen No. 1 to the plurality of screens, and includes the screen No. selected by the user.

The server 2a receives the mode changing request, and sets to the mirror display update mode (step S102).

The KVM switch 1 receives the mode changing request from the PC 11a via the transmitting and receiving unit 105 (step S103), and the controlling unit 104 analyzes the mode changing request (step S104). Specifically, the controlling unit 104 determines that the changing request for the screen update mode has been received based on a "changing request flag for the screen update mode" in FIG. 30, and specifies a target mode (i.e., a mode of a changed destination) according to a "mirror display update mode" in FIG. 30. At this time, the KVM switch 1 is set to the mirror display update mode.

Then, the controlling unit 104 transmits an output instruction of the video signal (here, the video signal corresponds to the screen No. 1) to the server 2a (step S105). The server 2a receives the output instruction of the video signal (step S106), and transmits the single video signal to the KVM switch 1 (step S107).

The conversion processing unit 103 of the KVM switch 1 receives the single video signal via the input unit 101a (step S108). Then, the procedure proceeds to steps S11 to S18 described in FIG. 6.

According to the present process, the PC 11a transmits a mirror display request for displaying the single image data on the plurality of screens in the remote operating application to the KVM switch 1 (step S101), and the transmitting and receiving unit 105 receives the request from the PC 11a (step S103). The conversion processing unit 103 converts the single video signal which is selected by the mirror display request among the video signals input from the input unit 101a, into the image data which can be displayed with the PC 11a (step S15), and the transmitting and receiving unit 105 transmits the converted image data to the PC 11a (step S15). Therefore, in the PC 11a, the mirror display displaying the single image data on the plurality of screens can executed.

It should be noted that the input source of the plurality of video signals may be the input unit 101b.

A description will now be given of a process to display any screen selected from a plurality of thumbnail-displays corresponding to the screen of the server 2a (i.e., the screens of monitors 4 to 7) in a normal size.

Figure 31:
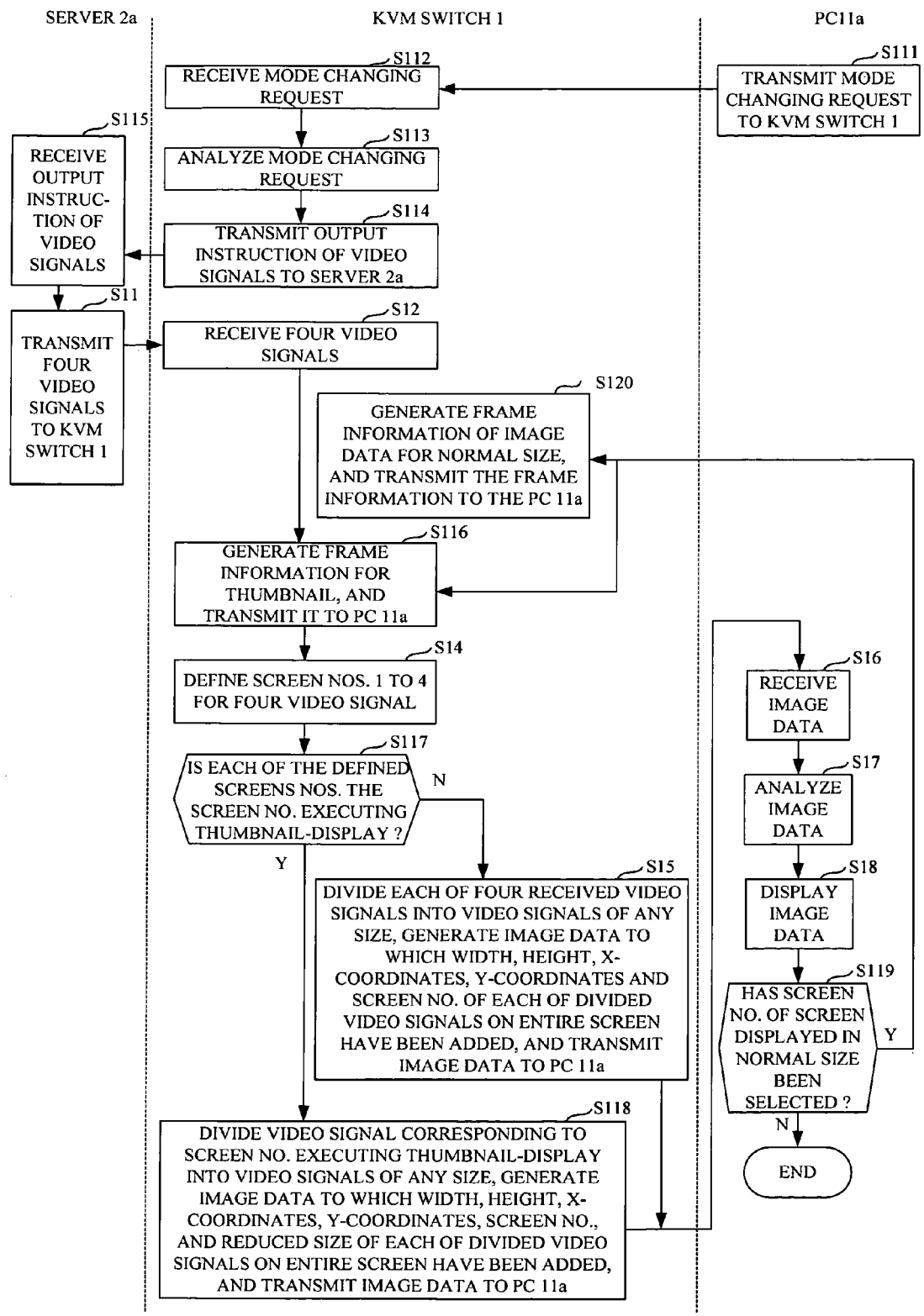
FIG. 31 is a flowchart showing a process to display any screen selected from a plurality of thumbnail-displays corresponding to the screen of the server 2a (i.e., the screens of monitors 4 to 7) in a normal size.

FIG. 31 is a flowchart showing the process to display any screen selected from the plurality of thumbnail-displays corresponding to the screen of the server 2a (i.e., the screens of monitors 4 to 7) in the normal size.

Figure 32:
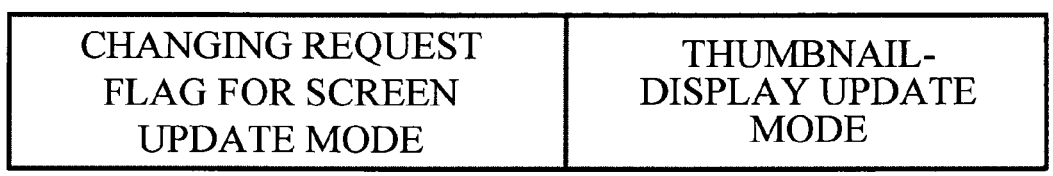
FIG. 32 is a diagram showing an example of data of the changing request in the screen update mode.

First, when the user of the PC 11a sets the change of the screen update mode from the normal update mode to a thumbnail-display update mode, the controlling unit 151a of the PC 11a transmits a mode changing request to the KVM switch 1 (step S111). At this time, the controlling unit 151a transmits a packet of data as shown in FIG. 32 to the KVM switch 1.

The KVM switch 1 receives the mode changing request from the PC 11a via the transmitting and receiving unit 105 (step S112), and the controlling unit 104 analyzes the mode changing request (step S113). Specifically, the controlling unit 104 determines that the changing request for the screen update mode has been received based on a "changing request flag for the screen update mode" in FIG. 32, and specifies a target mode (i.e., a mode of a changed destination) according to a "thumbnail-display update mode" in FIG. 32. At this time, the KVM switch 1 is set to the thumbnail-display update mode.

Then, the controlling unit 104 transmits an output instruction of the video signals to the server 2a (step S114). The server 2a receives the output instruction of the video signals (step S115). Then, the procedure proceeds to steps S11 to S18 described in FIG. 6.

On the behalf of step S13, the conversion processing unit 103 generates the frame information for thumbnail image data from each of the video signals, and transmits the frame information for the thumbnail image data to the PC 11a (Step S116). As shown in FIG. 33, the frame information is composed of a packet, and includes a width of the frame, a height of the frame, the number of bits for each pixel, luminance, maximum luminance of a red signal, maximum luminance of a green signal, maximum luminance of a blue signal, a shift value of the red signal, a shift value of the green signal, a shift value of the blue signal, a name named to identify each server set to the KVM switch 1, a length of the name, and a reduced size. Here, a value of reduced scale to the display area of the display unit 152a is input to the reduced size of the frame information, for example.

After the procedure of step S14, the conversion processing unit 103 determines whether each of the screens Nos. defined in step S14 is the screen No. executing the thumbnail-display (step S117).

Figure 34:
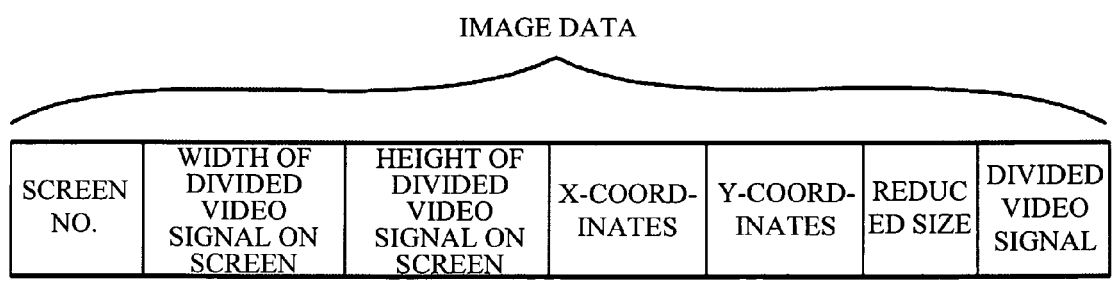
FIG. 34 is a diagram showing the data structure of thumbnail image data.

When the answer to the determination of step S117 is "NO", the procedure proceeds to step S15. On the other hand, when the answer to the determination of step S117 is "YES", the conversion processing unit 103 divides the video signal corresponding to the screen No. executing the thumbnail-display into any size, e.g. a data size of 16×16 pixels, and adds a width, a height, x-coordinates (i.e., x-coordinates of an edge point in the upper right of each divided video signal), y-coordinates (i.e., y-coordinates of an edge point in the upper right of each divided video signal), the screen No., and the reduced size of each divided video signal on the entire screen to the corresponding divided video signal to thereby generate the thumbnail image data as shown in FIG. 34. The conversion processing unit 103 transmits the thumbnail image data to the PC 11a (step S118).

Figure 35A:
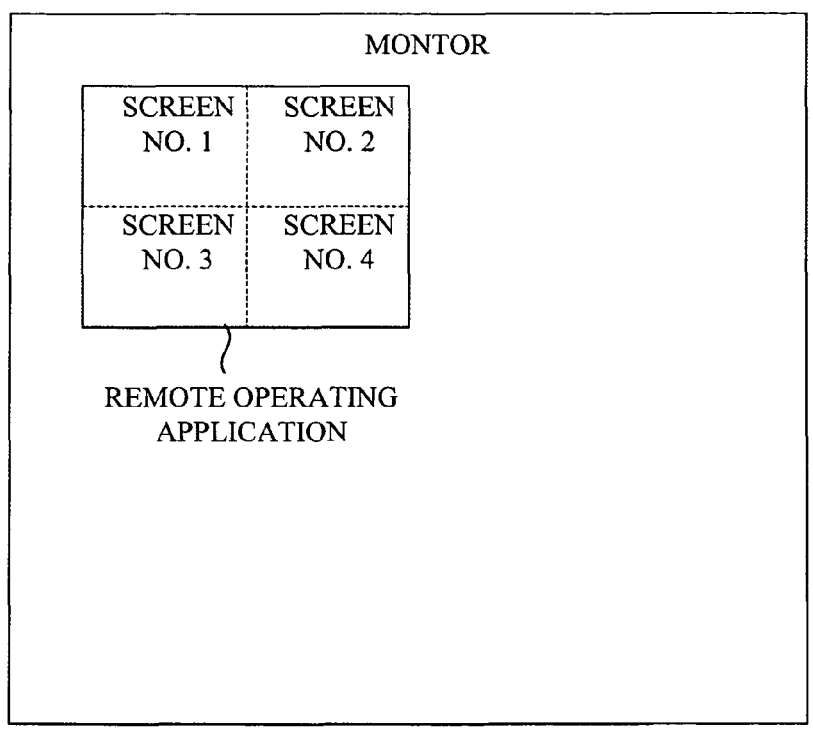
FIG. 35A is a diagram showing an example of the display of a monitor 12a immediately after the change to a thumbnail update mode.

Since the screen displayed in a normal size is not selected immediately after the change to the thumbnail-display update mode, the pieces of the thumbnail image data to all the screens are generated. At this time, an example of the display of the monitor 12a is shown in FIG. 35A.

After the procedure of step S18, the controlling unit 151a of the PC 11a determines whether the screen No. of the screen displayed in the normal size has been selected (step S119).

When the answer to the determination of step S119 is "NO", the present process is terminated. On the other hand, when the answer to the determination of step S119 is "YES", the conversion processing unit 103 generates the frame information of the image data for the normal size from the video signal corresponding to the selected screen No., and transmits the frame information of the image data for the normal size to the PC 11a (step S120). At the same time, the conversion processing unit 103 generates the frame information for the thumbnail image data from the video signal corresponding to unselected screen No. according to step S116, and transmits the frame information for the thumbnail image data to the PC 11a.

Figure 35B:
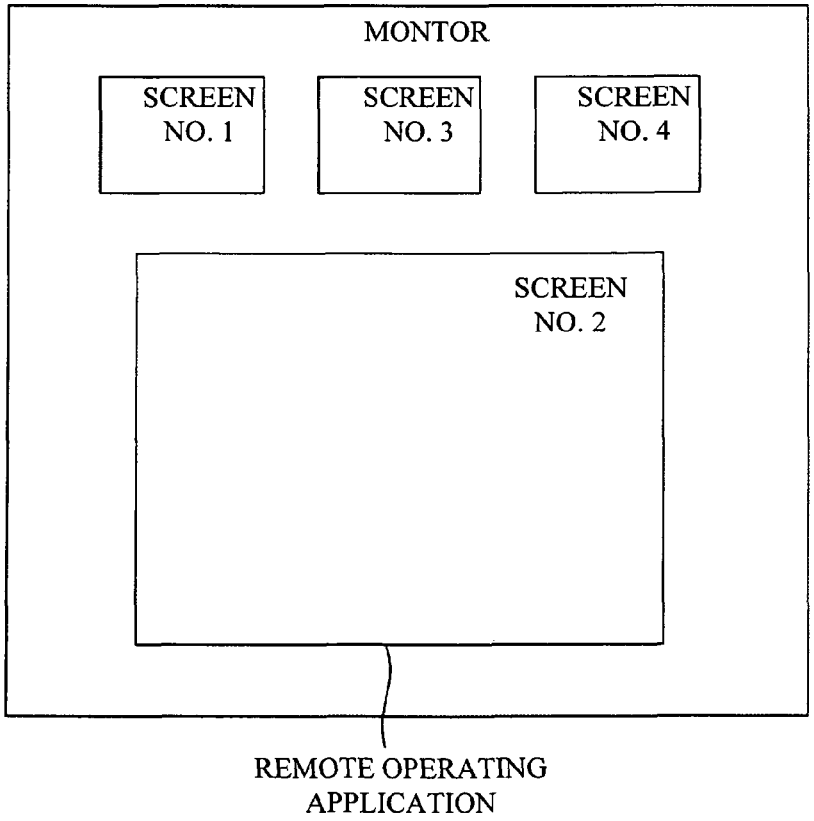
FIG. 35B is a diagram showing an example of the display of the monitor 12a after the screen No. 2 is selected.

Then, when the procedures of steps S15 to S18, S117, and S118 are executed, the image data corresponding to the selected screen No. is displayed in the normal size, and the image data corresponding to the unselected screen No. is displayed in the thumbnail, as shown in FIG. 35B. In FIG. 35B, the screen No. 2 is selected, and the image data corresponding to the screen No. 2 is displayed in the normal size.

According to the present process, the PC 11a transmits to the KVM switch 1 a request for displaying the image data selected by the user in the normal size, and displaying the image data unselected by the user in the reduced size, among the plurality of pieces of image data displayed on the remote operating application (step S111), and the transmitting and receiving unit 105 receives the request from the PC 11a (step S112). The conversion processing unit 103 converts the video signal corresponding to the selected image data into the image data of the normal size, and converts the video signal corresponding to the unselected image data into the image data of the reduced size, among the plurality of video signals input from the input unit 101a (steps S15 and S118). The transmitting and receiving unit 105 transmits the pieces of the converted image data to the PC 11a.

Therefore, the present process can reduce the amount of transmission of the pieces of the image data transmitted to the PC 11a, and hence the display of the pieces of the image data in the PC 11a is smoothly updated. Further, the load to the network can be reduced.

It should be noted that the input source of the plurality of video signals may be the input unit 101b.

A description will now be given of a multi-monitor environment in the PC 11b.

Figure 36:
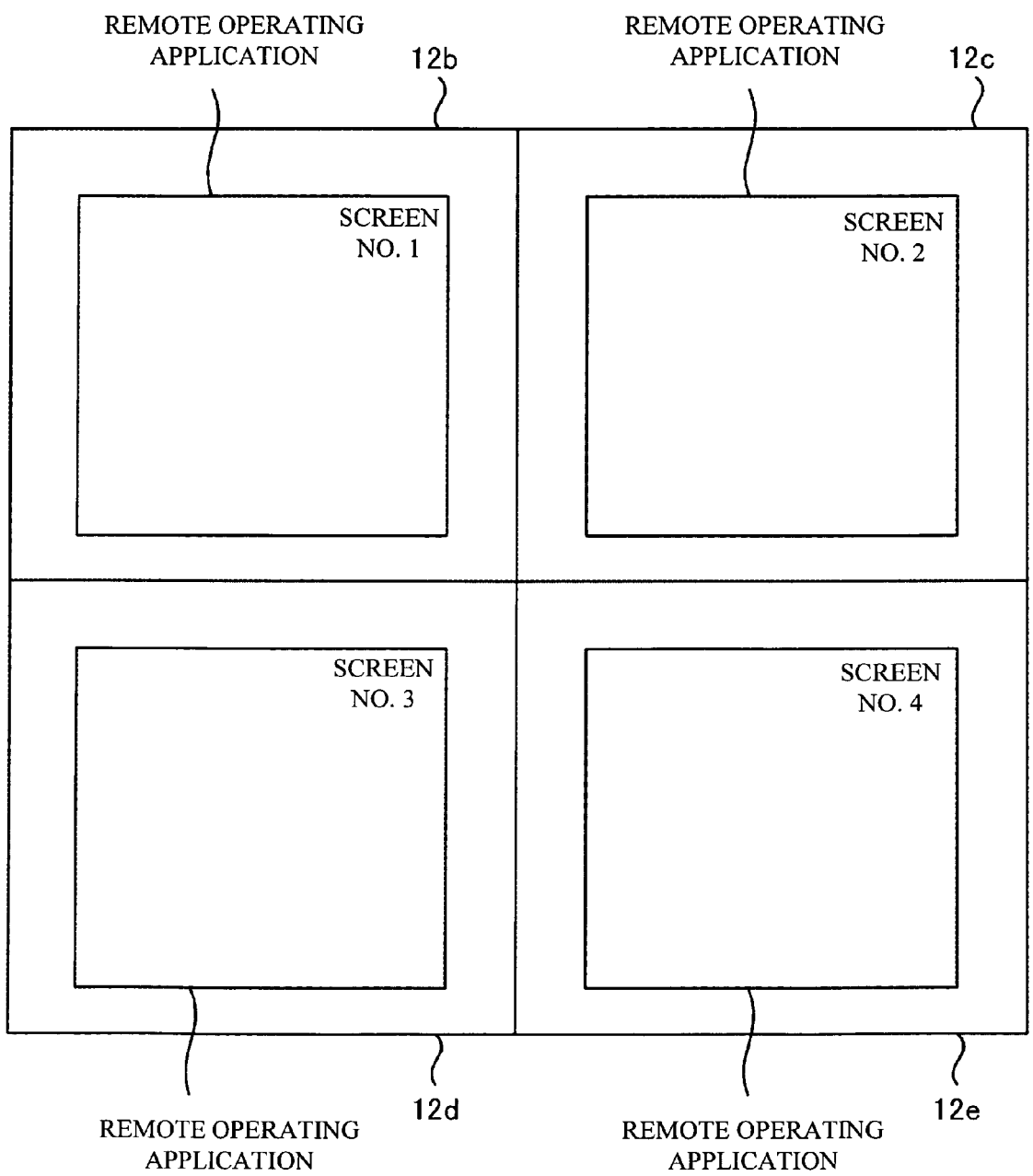
FIG. 36 is a diagram showing display screens of monitors 12b to 12e of the PC 11b.

FIG. 36 is a diagram showing display the screens of the monitors 12b to 12e of the PC 11b.

The remote operating application in the PC 11b has windows corresponding to the number of screens of the server 2a (i.e., the monitors 4 to 7 of the local side), and displays the pieces of the image data of the screen Nos. 1 to 4 on the respective windows. Further, the PC 11b adapts to the multi-monitor, so that each of the windows in the remote operating application can be displayed on each of the monitors, and an operation equal with the case to operate the server 2a with a multi-monitor function at the local becomes possible.

The PC 12b has the monitors 12b to 12e which are the same numbers as the plurality of video signals output from the server 2a or 2b, and the transmitting and receiving unit 105 transmits the plurality of pieces of image data converted by the conversion processing unit 103 to the monitors 12b to 12e, respectively. Therefore, each of the monitors can display single image data.

A description will now be given of enlargement/reduction display of the screen of the server 2a (i.e., the screens of the monitor 4 to 7) displayed on the remote operating application.

Figure 37:
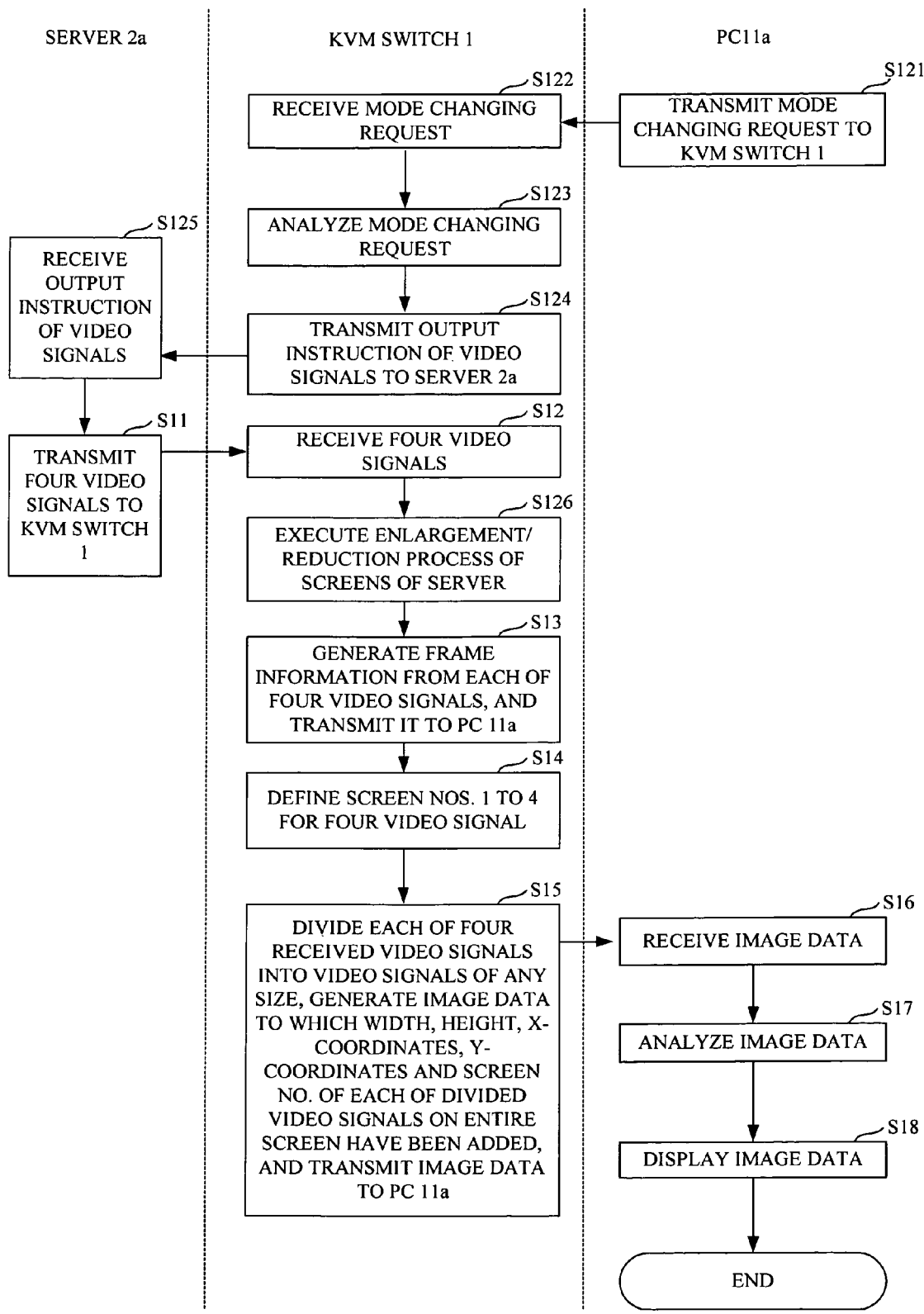
FIG. 37 is a flowchart showing an enlargement/reduction displaying process of the screen of the server 2a displayed on the remote operating application.

FIG. 37 is a flowchart showing an enlargement/reduction displaying process of the screen of the server 2a displayed on the remote operating application.

First, when the user of the PC 11a sets the change of the screen update mode from the normal update mode to an enlargement/reduction displaying update mode, the controlling unit 151a of the PC 11a transmits a mode changing request to the KVM switch 1 (step S121). At this time, the controlling unit 151a transmits a packet of data as shown in FIG. 38 to the KVM switch 1.

The KVM switch 1 receives the mode changing request from the PC 11a via the transmitting and receiving unit 105 (step S122), and the controlling unit 104 analyzes the mode changing request (step S123). Specifically, the controlling unit 104 determines that the changing request for the screen update mode has been received based on a "changing request flag for the screen update mode" in FIG. 38, specifies a target mode (i.e., a mode of a changed destination) according to an "enlargement/reduction displaying update mode" in FIG. 38, and decides an enlargement/reduction ratio of the screens of the server according to an "enlargement/reduction ratio" in FIG. 38. At this time, the KVM switch 1 is set to the enlargement/reduction displaying update mode.

Then, the controlling unit 104 transmits an output instruction of the video signals to the server 2a (step S124). The server 2a receives the output instruction of the video signals (step S125). And, the procedure proceeds to steps S11 to S18 described in FIG. 6.

After the procedure of step S12, the conversion processing unit 103 executes an enlargement/reduction process of screens of the server based on the enlargement/reduction ratio (step S126), and the procedure proceeds to step S13. When the enlargement/reduction process is executed, the width and the height of the frames corresponding to the pieces of the frame information generated in step S113 are enlarged or reduced. The conversion processing unit 103 sets the ratio of screens of the server such as a full screen, a double size, a half size, the same ratio as the window size, and so on.

When the screens of the server are displayed on one window of the remote operating application, the width and the height of the window are decided by the following equations 5) and 6).

width of window=total width of screens of server*enlargement/reduction ratio     Equation 5 height of window=total height of screens of server*enlargement/reduction ratio     Equation 6

When each of the screens of the monitors 4 to 7 is displayed on a separate window, the width and the height of each window are decided by the following equations 7) and 8).

$$\text{width of each window} = \text{width of screen of each server} * \text{enlargement/reduction ratio} \quad \text{Equation 7}$$

$$\text{height of each window} = \text{height of screen of each server} * \text{enlargement/reduction ratio} \quad \text{Equation 8}$$

For example, when a size of window of the remote operating application is larger than a size of screen transmitted from the server, a scroll bar is displayed on the window of the remote operating application, and the screen transmitted from the server can be moved in the window.

According to the present process, the PC 11a transmits to the KVM switch 1 a request for enlargement/reduction of the plurality of screens corresponding to the plurality of pieces of image data displayed on the remote operating application (step S121), and the transmitting and receiving unit 105 receives the request from the PC 11a (step S122). The conversion processing unit 103 enlarges or reduces the plurality of screens which display the plurality of pieces of image data corresponding to the plurality of video signals input from the input unit 101a, based on the enlargement/reduction ratio of the screens included in the request (step S126). The transmitting and receiving unit 105 transmits the pieces of the enlarged/reduced image data to the PC 11a (step S15).

Therefore, the PC 11a can enlarge or reduce the plurality of screens displayed on the single remote operating application, and display them. As a result, the user can collectively confirm the plurality of screens.

It should be noted that the input source of the plurality of video signals may be the input unit 101b.

Figure 39:
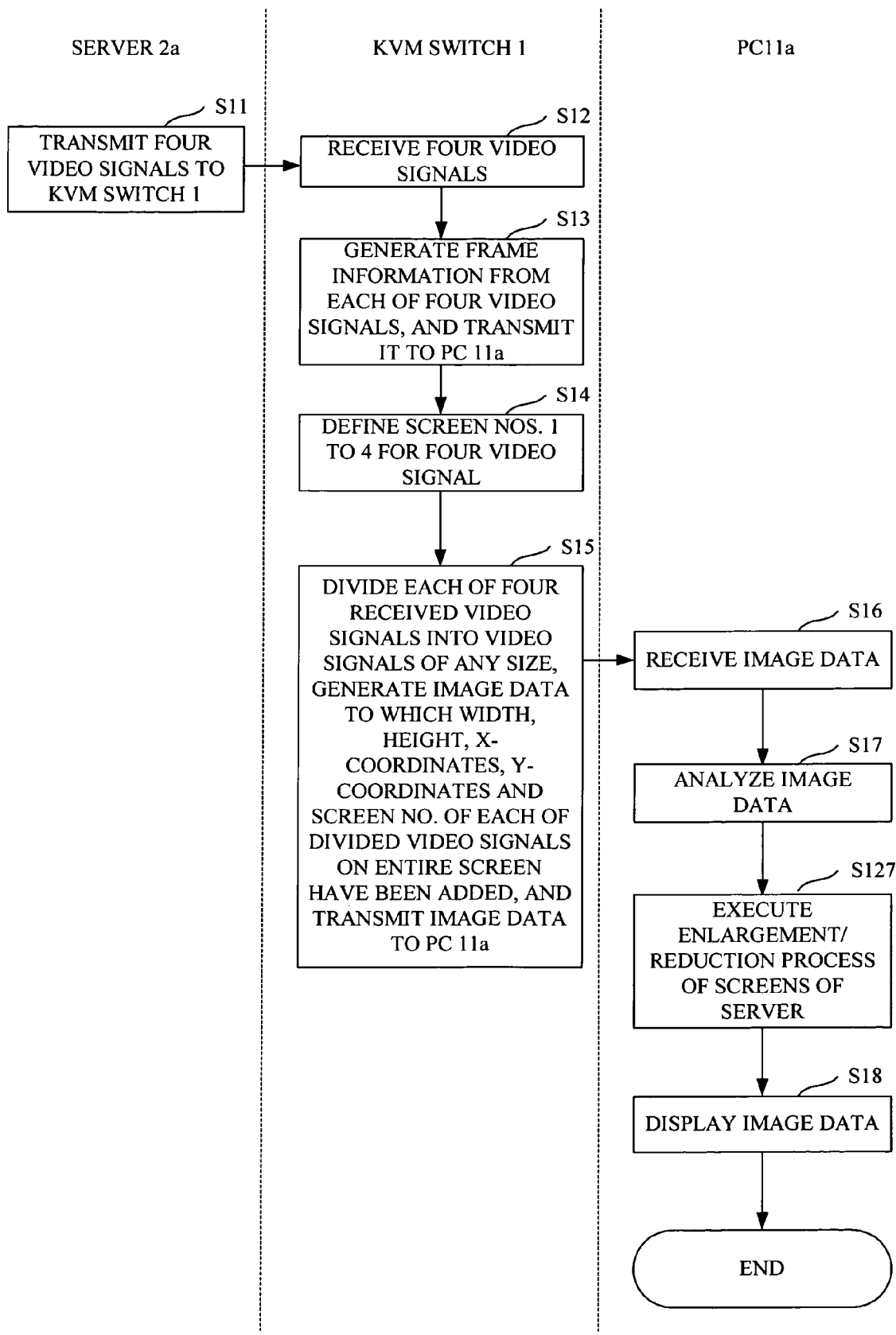
FIG. 39 is a flowchart showing an enlargement/reduction displaying process of the screen of the server 2a displayed on the remote operating application.

FIG. 39 is a flowchart showing an enlargement/reduction displaying process of the screen of the server 2a displayed on the remote operating application.

The present process adds the procedures in which the PC 11a executes the enlargement/reduction displaying process of the screen of the server 2a to the process in FIG. 6. In the following, only those in which the present process differs from the process in FIG. 6 will be described.

After the procedure of step S17, the controlling unit 151a of the PC 11a executes an enlargement/reduction process of screens of the server based on the enlargement/reduction ratio set via the input unit 153a (step S127), and the procedure proceeds to step S18.

The ratio of screens of the server such as a full screen, a double size, a half size, the same rate as the window size, and so on is set by the remote operating application.

When the screens of the server are displayed on one window of the remote operating application, the width and the height of the window are decided by the following equations 5) and 6).

$$\text{width of window} = \text{total width of screens of server} * \text{enlargement/reduction ratio} \quad \text{Equation 5}$$

$$\text{height of window} = \text{total height of screens of server} * \text{enlargement/reduction ratio} \quad \text{Equation 6}$$

When each of the screens of the monitors 4 to 7 is displayed on a separate window, the width and the height of each window are decided by the following equations 7) and 8).

$$\text{width of each window} = \text{width of screen of each server} * \text{enlargement/reduction ratio} \quad \text{Equation 7}$$

$$\text{height of each window} = \text{height of screen of each server} * \text{enlargement/reduction ratio} \quad \text{Equation 8}$$

According to the present process, the PC 11a can enlarge or reduce the plurality of screens displayed on the single remote operating application, and display them. As a result, the user can collectively confirm the plurality of screens.

A description will now be given of a process to output the screen of the server 2a to the monitor 12a or the monitors 12b to 12e, and output data from the keyboard 13a or 13b and the mouse 14a or 14b to the server 2a or 2b.

Figure 40A:
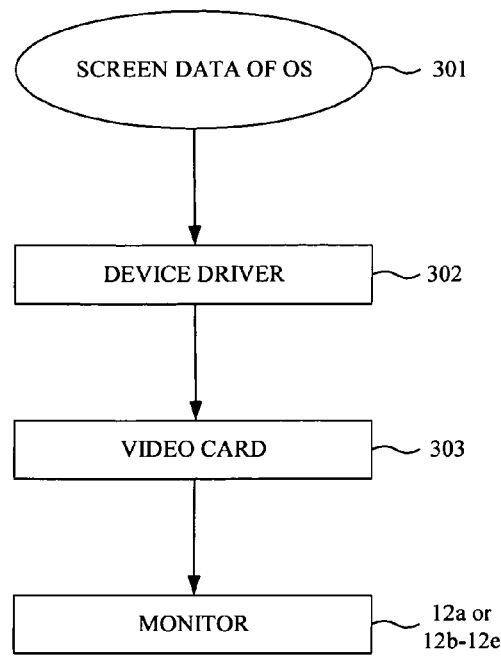
FIG. 40A is a diagram showing the configuration in which screen data of an OS (Operating System) is output to the monitor 12a or the monitors 12b to 12e.
Figure 40B:
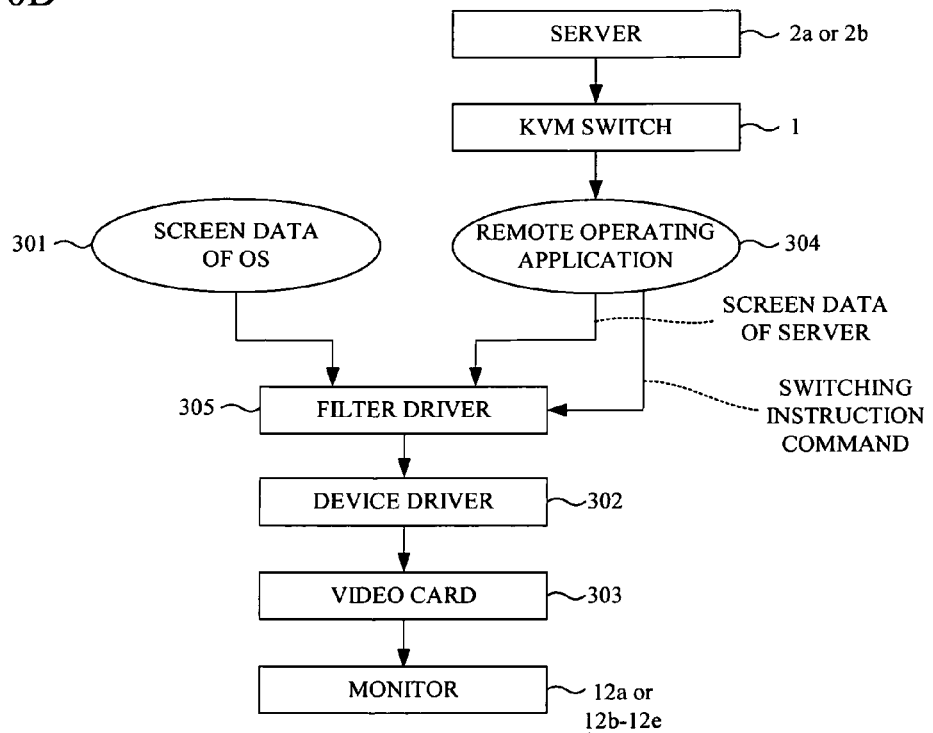
FIG. 40B is a diagram showing the configuration in which the screen of the server 2a is output to the monitor 12a or the monitors 12b to 12e.
Figure 40C:
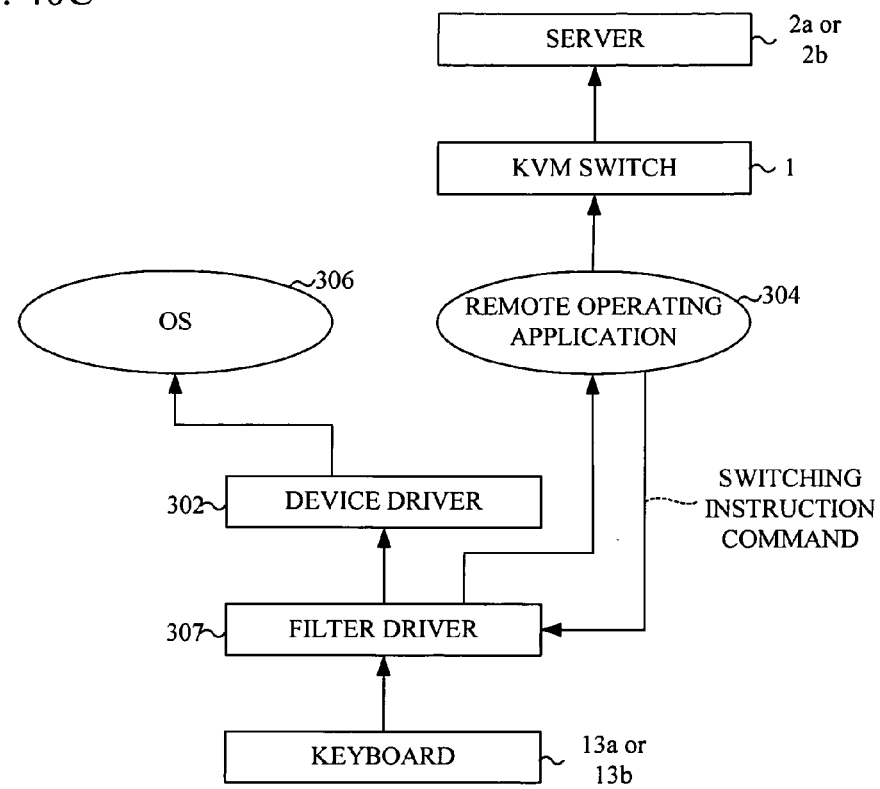
FIG. 40C is a diagram showing the configuration in which data from the keyboard 13a or 13b is output to the server 2a or 2b.
Figure 40D:
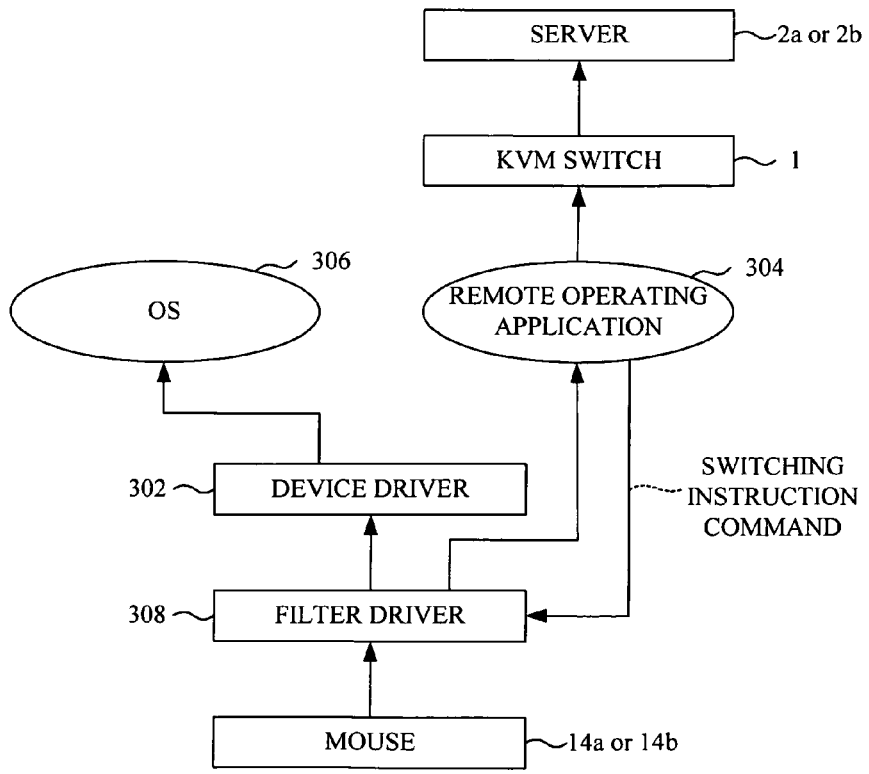
FIG. 40D is a diagram showing the configuration in which data from the mouse 14a or 14b is output to the server 2a or 2b.

FIG. 40A is a diagram showing the configuration in which screen data of an OS (Operating System) is output to the monitor 12a or the monitors 12b to 12e, FIG. 40B is a diagram showing the configuration in which the screen of the server 2a is output to the monitor 12a or the monitors 12b to 12e, FIG. 40C is a diagram showing the configuration in which data from the keyboard 13a or 13b is output to the server 2a or 2b, and FIG. 40D is a diagram showing the configuration in which data from the mouse 14a or 14b is output to the server 2a or 2b.

As shown in FIG. 40A, screen data 301 of the OS is output to the monitor 12a or the monitors 12b to 12e connected to a video card 303 via a device driver 302. In this case, the PC 11a or 11b includes the screen data 301 of the OS, the device driver 302, and the video card 303. Further, the PC 11a or the PC 11b includes filter drivers 305 to 307 as described later.

In the present embodiment, as shown in FIG. 40B, the filter driver 305 selectively switches between the screen data 301 of the OS and the screen data of the server 2a received by a remote operating application 304 to transmit any one of them to the device driver 302, and is provided between the screen data 301 of the OS and the remote operating application 304, and the device driver 302.

By a switching instruction command from the remote operating application 304, the filter driver 305 can transmits the screen data 301 of the OS or the screen data of the server 2a received by the remote operating application 304 to the device driver 302.

As shown in FIG. 40C, the filter driver 307 switches a data transmission destination of the key data from the keyboard 13a or 13b to an OS 306 or the remote operating application 304, by the switching instruction command from the remote operating application 304. The filter driver 307 is provided between the keyboard 13a or 13b and the device driver 302.

As shown in FIG. 40D, the filter driver 308 switches a data transmission destination of the mouse data from the mouse 14a or 14b to the OS 306 or the remote operating application 304, by the switching instruction command from the remote operating application 304. The filter driver 308 is provided between the keyboard 13a or 13b and the device driver 302.

Therefore, the data of the keyboard and the mouse of the PC 11a or 11b is transmitted to the remote operating application 304, transmitted from the remote operating application 304 to the KVM switch 1, and transmitted from the KVM switch 1 to the server 2a.

According to the present process, the remote operating application 304 transmits the received screen data of the server 2a to the device driver 302, so that the screen of the server 2a without displaying a window frame, other menus and icons, and so on is directly displayed. Further, the filter driver 308 switches the data transmission destination so as to transmit the data of the keyboard 13a or 13b and the mouse 14a or 14b to the remote operating application 304, so that a state to operate the server 2a on the spot (where the server 2a is placed) can be achieved at a remote place, and operational feelings equivalent to conventional operational feelings can be provided for an operator.

In the configuration of the filter drivers 305 to 307 and the device driver 302, the device driver 302 may be replaced with a new device driver including the functions of the filter drivers 305 to 307.

A recording medium on which the software program for realizing the functions of the KVM switch 1 is recorded may be supplied to the KVM switch 1, and the controlling unit 104 may read and execute the program recorded on the recording medium. In this manner, the same effects as those of the above-described embodiment can be achieved. The recording medium for providing the program may be a CD-ROM, a DVD, or a SD card, for example.

The KVM switch 1 may execute the software program for realizing the functions of the KVM switch 1. In this manner, the same effects as those of the above described embodiment can also be achieved.

It should be noted that the present invention is not limited to the embodiment, and various modifications may be made to them without departing from the scope of the invention.

The Present application is based on Japanese Patent Application No. 2007-271794 filed Oct. 18, 2007, the entire disclosure of which is hereby incorporated by reference.

What is claimed is:

1. A KVM switch connected between information processing apparatuses, and a remote terminal, the KVM switch comprising:
   a first input portion configured to input a plurality of video signals output from a first information processing apparatus, the plurality of videos signals output from the first information processing apparatus corresponding to different image data displayed on the remote terminal, respectively;
   a second input portion configured to input a plurality of video signals output from a second information processing apparatus, the plurality of videos signals output from the second information processing apparatus corresponding to different image data displayed on the remote terminal, respectively;
   a converting portion that converts each of the plurality of video signals input from the first input portion or the second input portion into image data different from each other which is configured to be displayed on a display of the remote terminal, the converting portion defining a screen on the display of the remote terminal for each of the plurality of video signals input from the first input portion or the second input portion such that a number of screens on the display is equal to a number of video signals input, dividing each of the plurality of video signals input from the first input portion or the second input portion into pieces of divided data for each of the defined screens, and adding information that decides a display position and a display size of an image related to the divided data for each screen of the display and type information of the video signal corresponding to the divided data to each divided data to generate the image data corresponding to the video signal;
   a transmitting and receiving portion that transmits each of the converted image data to the remote terminal, and receives various requests from the remote terminal;
   a switching portion that switches the plurality of video signals input from the first input portion to the plurality of video signals input from the second input portion when the transmitting and receiving portion receives a switching request for switching from the first information processing apparatus to the second information processing apparatus from the remote terminal; and
   a first output portion that outputs data which the transmitting and receiving portion receives from the remote terminal, to the first information processing apparatus, and
   a second output portion that outputs data which the transmitting and receiving portion receives from the remote terminal, to the second information processing apparatus, wherein
   when the transmitting and receiving portion receives the switching request, the switching portion switches an output source of the data received from the remote terminal from the first output portion to the second output portion.

2. The KVM switch as claimed in claim 1, wherein when the transmitting and receiving portion receives a request for exchanging the positions of the plurality of pieces of image data displayed on the remote terminal with each other from the remote terminal,
   the converting portion exchanges the positions of the plurality of pieces of image data to be displayed on the remote terminal with each other based on the request, and
   the transmitting and receiving portion transmits the plurality of pieces of image data with which the positions have been exchanged, to the remote terminal.

3. The KVM switch as claimed in claim 1, wherein when the transmitting and receiving portion receives a request for receiving image data corresponding to a difference between present image data displayed on the remote terminal and preceding image data that immediately precedes the present image data,
   the converting portion detects, with respect to each of the plurality of input video signals, a difference between the present video signal and the preceding video signal, and converts a video signal corresponding to the difference into the image data to be displayed on the remote terminal, and
   the transmitting and receiving portion transmits the converted image data to the remote terminal.

4. The KVM switch as claimed in claim 1, wherein when the transmitting and receiving portion receives a mirror display request for displaying one image data on a plurality of screens in the remote terminal, from the remote terminal,
   the converting portion converts one video signal selected by the mirror display request among the plurality of input video signals into the image data which is capable of being displayed on the remote terminal, and
   the transmitting and receiving portion transmits the converted image data to the remote terminal.

5. The KVM switch as claimed in claim 1, wherein when the transmitting and receiving portion receives from the remote terminal a request for displaying the image data selected by a user in a normal size and the image data unselected by the user in a reduced size, among the plurality of image data displayed on the remote terminal,
   the converting portion converts the video signal corresponding to the selected image data into the image data of the normal size, and the video signal corresponding to the unselected image data into the image data of the reduced size, and
   the transmitting and receiving portion transmits the pieces of converted image data to the remote terminal.

6. The KVM switch as claimed in claim 1, wherein when the transmitting and receiving portion receives a request for enlargement/reduction of a plurality of screens, each of which corresponds to one of the plurality of pieces of image data displayed on the remote terminal from the remote terminal, the converting portion enlarges or reduces a size of each screen displaying image data corresponding to the plurality of input video signals based on an enlargement/reduction ratio of the plurality of screens included in the request, and the transmitting and receiving portion transmits data of the plurality of enlarged or reduced screens to the remote terminal.

7. The KVM switch as claimed in claim 1, wherein the information that decides a display position includes x-coordinates of an edge point in an upper right of the divided data and y-coordinates of the edge point in an upper right of the divided data and the information that decides a display size includes a width and a height of the divided data on the screen of the remote terminal.

8. The KVM switch as claimed in claim 1, wherein
at least one of the first input portion and the second input portion inputs the video signals of a number corresponding to a request for changing the number of pieces of image data displayed on the remote terminal, the converting portion converts the video signals of the number corresponding to the request into pieces of image data to be displayed on the remote terminal, and changes the display positions of the pieces of the converted image data on the remote terminal, and the transmitting and receiving portion transmits the pieces of the image data in which the display positions have been changed, to the remote terminal.

9. A switching system for multi-monitor comprising:
a first information processing apparatus and a second information processing apparatus that each include a plurality of video terminals and each output a plurality of video signals from the plurality of video terminals, respectively;

a KVM switch including:
a first input portion configured to input the plurality of video signals output from the plurality of video terminals of the first information processing apparatus, the plurality of videos signals output from the first information processing apparatus corresponding to different image data displayed on the remote terminal, respectively;

a second input portion configured to input the plurality of video signals output from the plurality of video terminals of the second information processing apparatus, the plurality of videos signals output from the second information processing apparatus corresponding to different image data displayed on the remote terminal, respectively;

a converting portion that converts the plurality of video signals input from the first input portion or the second input portion into a plurality of pieces of image data which are configured to be displayed on a display of the remote terminal, the converting portion defining a screen on the display of the remote terminal for each of the plurality of video signals input from the first input portion or the second input portion such that a number of screens on the display is equal to a number of video signals input, dividing each of the plurality of video signals input from the first input portion or the second input portion into pieces of divided data for each of the defined screens, and adding information that decides a display position and a display size of an image related to the divided data for each screen of the display and type information of the video signal corresponding to the divided data to each divided data to generate the image data corresponding to the video signal;

a transmitting and receiving portion that transmits the plurality of pieces of converted image data to the remote terminal, and receives various requests from the remote terminal; and a switching portion that switches the plurality of video signals input from the first input portion to the plurality of video signals input from the second input portion when the transmitting and receiving portion receives a switching request for switching from the first information processing apparatus to the second information processing apparatus from the remote terminal, wherein the remote terminal is connected to the KVM switch via a network, and displays the plurality of pieces of converted image data on a single application, the KVM switch further includes a first output portion that outputs data which the transmitting and receiving portion receives from the remote terminal, to the first information processing apparatus, and a second output portion that outputs data which the transmitting and receiving portion receives from the remote terminal, to the second information processing apparatus, and when the transmitting and receiving portion receives the switching request from the remote terminal, the switching portion switches an output source of the data received from the remote terminal to the output portion corresponding to the information processing apparatus to be switched.

10. The switching system for multi-monitor as claimed in claim 9, wherein the video terminals of each information processing apparatus are connected to the corresponding input portion with a single cable.

11. The switching system for multi-monitor as claimed in claim 10, wherein the video terminals of each information processing apparatus are connected to the corresponding input portion with a single cable including a circuit which converts the input video signals into a single digital signal.

12. The switching system for multi-monitor as claimed in claim 9, wherein a keyboard, a mouse or a touch panel is connectable to the remote terminal, and the data received from the remote terminal is output according to the operation of the keyboard, the mouse or the touch panel.

13. The switching system for multi-monitor as claimed in claim 9, wherein the remote terminal transmits a request for exchanging the positions of image data displayed on the screen with each other to the KVM switch, the converting portion exchanges the positions of the image data with each other based on the request received from the remote terminal, and the transmitting and receiving portion transmits the image data with which the positions have been exchanged, to the remote terminal.

14. The switching system for multi-monitor as claimed in claim 9, wherein the remote terminal transmits a request for changing the number of pieces of image data displayed on the screen to one of the information processing apparatuses via the KVM switch, the information processing apparatus that has received the request outputs the video signal(s) of the number corresponding to the request to the KVM switch, the converting portion converts the video signal(s) of the number corresponding to the request input from the information processing apparatus into piece(s) of image data to be displayed on the screen, and changes the display position(s) of the piece(s) of the converted image data on the screen, and the transmitting and receiving portion transmits the piece(s) of the image data in which the display position(s) has/have been changed, to the remote terminal.

15. The switching system for multi-monitor as claimed in claim 9, wherein the remote terminal transmits a request for receiving differences between the pieces of present image data and the pieces of image data immediately preceding the present image data,
the converting portion detects, with respect to each of the plurality of video signals input from the input portion, differences between the present video signal and the immediately preceding video signal, and converts a video signal corresponding to the differences into the differential image data when the request from the remote terminal is received,
the transmitting and receiving portion transmits the differential image data to the remote terminal, and
the remote terminal displays a screen corresponding to the differential image data.

16. The switching system for multi-monitor as claimed in claim 9, wherein the remote terminal transmits a mirror display request for displaying one image data on a plurality of screens in the remote terminal, to the KVM switch,
the converting portion converts, when the request is received from the remote terminal, one video signal selected by the mirror display request among the plurality of video signals input from the input portion into the image data
the transmitting and receiving portion transmits the converted image data to the remote terminal, and
the remote terminal displays the received image data to the plurality of screens.

17. The switching system for multi-monitor as claimed in claim 9, wherein the remote terminal transmits to the KVM switch a request for displaying the image data selected by a user in a normal size and the image data unselected by the user in a reduced size, among the plurality of image data to be displayed on a screen of the remote terminal,
the converting portion converts, when the request is received from the remote terminal, the video signal corresponding to the selected image data into the image data of the normal size, and the video signal corresponding to the unselected image data into the image data of the reduced size, among the input video signals, and
the transmitting and receiving portion transmits the pieces of converted image data to the remote terminal.

18. The switching system for multi-monitor as claimed in claim 9, wherein the remote terminal transmits a request for enlargement/reduction of a plurality of screens corresponding to the plurality of pieces of image data to the KVM switch,
the converting portion enlarges or reduces the plurality of screens displaying the plurality of pieces of image data corresponding to the plurality of input video signals based on an enlargement/reduction ratio of the plurality of screens included in the request received from the remote terminal, and
the transmitting and receiving portion transmits data of the plurality of enlarged or reduced screens to the remote terminal.

19. The switching system for multi-monitor as claimed in claim 9, wherein the remote terminal includes the display devices of the same number as the video signals output from the information processing apparatus, and the transmitting and receiving portion transmits each of the converted image data to one of the display devices, respectively.

20. The switching system for multi-monitor as claimed in claim 19, wherein the display devices of the same number as the video signals output from the information processing apparatus are connected to the KVM switch, each of the display devices connected to the KVM switch corresponding to one of the display devices of the remote terminal, and each of the display devices included in the remote terminal displays the same image data as the image data displayed on the corresponding display device connected to the KVM switch.

21. A KVM switch connected between information processing apparatuses and a remote terminal, the KVM switch comprising:
a first input portion configured to input a plurality of video signals output from a first information processing apparatus, the plurality of videos signals output from the first information processing apparatus corresponding to different image data displayed on the remote terminal, respectively;
a second input portion configured to input a plurality of video signals output from a second information processing apparatus, the plurality of videos signals output from the second information processing apparatus corresponding to different image data displayed on the remote terminal, respectively;
a converting portion that converts each of the plurality of video signals input from the first input portion or the second input portion into image data different from each other which is configured to be displayed on a display of the remote terminal, the converting portion defining a screen on the display of the remote terminal for each of the plurality of video signals input from the first input portion or the second input portion such that a number of screens on the display is equal to a number of video signals input, dividing each of the plurality of video signals input from the first input portion or the second input portion into pieces of divided data for each of the defined screens, and adding information that decides a display position and a display size of an image related to the divided data for each screen of the display and type information of the video signal corresponding to the divided data to each divided data to generate the image data corresponding to the video signal;
a transmitting and receiving portion that transmits each of the converted image data to the remote terminal, and receives various requests from the remote terminal; and
a switching portion that switches the plurality of video signals input from the first input portion to the plurality of video signals input from the second input portion when the transmitting and receiving portion receives a switching request for switching from the first information processing apparatus to the second information processing apparatus from the remote terminal, wherein
when the transmitting and receiving portion receives a request for exchanging the positions of the plurality of pieces of image data displayed on the remote terminal with each other from the remote terminal,
the converting portion exchanges the positions of the plurality of pieces of image data to be displayed on the remote terminal with each other based on the request, and
the transmitting and receiving portion transmits the plurality of pieces of image data with which the positions have been exchanged, to the remote terminal.

* * * * *